US012745061B2

(12) United States Patent
Hirzallah et al.

(10) Patent No.: US 12,745,061 B2
(45) Date of Patent: Sep. 22, 2026

(54) POSITIONING TRAINING AND DATA COLLECTION WITH CHANNEL ESTIMATION ERRORS

(71) Applicant: QUALCOMM Incorporated, San Diego, CA (US)

(72) Inventors: Mohammed Ali Mohammed Hirzallah, San Diego, CA (US); Srinivas Yerramalli, San Diego, CA (US); Rajat Prakash, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 452 days.

(21) Appl. No.: 18/324,052

(22) Filed: May 25, 2023

(65) Prior Publication Data

US 2024/0397286 A1 Nov. 28, 2024

(51) Int. Cl.
*H04W 4/029* (2018.01)
*H04W 24/02* (2009.01)

(52) U.S. Cl.
CPC ........... *H04W 4/029* (2018.02); *H04W 24/02* (2013.01)

(58) Field of Classification Search
None
See application file for complete search history.

(56) References Cited

U.S. PATENT DOCUMENTS

2021/0125075 A1 4/2021 Lee
2024/0152814 A1* 5/2024 Feki ....................... G06N 20/00
2025/0142291 A1* 5/2025 Thomas ................ H04W 24/02
2025/0225443 A1* 7/2025 Tian ...................... H04W 16/22

FOREIGN PATENT DOCUMENTS

WO 2023077274 A1 5/2023

OTHER PUBLICATIONS

International Search Report and Written Opinion—PCT/US2024/028947—ISA/EPO—Sep. 24, 2024.

* cited by examiner

*Primary Examiner* — Adolf Dsouza
(74) *Attorney, Agent, or Firm* — Procopio, Cory, Hargreaves & Savitch LLP

(57) ABSTRACT

A wireless device may receive a set of positioning signals. The wireless device may measure the set of positioning signals based on at least one of a plurality of sparse pilot masks or a plurality of artificial noise signals. The wireless device may output the measured set of positioning signals for training a positioning model. The wireless device may output the measured set of positioning signals for training a positioning model by training the positioning model at the wireless device based on the measured set of positioning signals or may transmitting, to a training entity, the measured set of positioning signals for training the positioning model. The training entity may train the positioning model based on the measured set of positioning signals. The wireless device may include a user equipment (UE) or a network node.

30 Claims, 20 Drawing Sheets

One Frame (TDD)
10 ms
200
subframe
RB
slot
D D D D D D D D D D D D F U
subcarrier
OFDM symbol
slot
DMRS R
CSI-RS 230
PDCCH CORESET
SSS
PSS
PDSCH
PBCH
REG 12 REs
1 CCE = 6 REGs
SS/PBCH Block
BWP
BWP
20 RBs
channel bandwidth RBs One Frame (TDD)
10 ms
250
subframe
RB
slot
U U U U U U U U U U U U U U
subcarrier
OFDM symbol
slot
SRS
SRS Comb 0
SRS Comb 1
DMRS R

280
PUCCH
PUSCH

500
Comb-2 with 2 symbols

510
Comb-2 with 6 symbols

520
Comb-2 with 12 symbols

530
Comb-4 with 4 symbols

540
Comb-4 with 12 symbols

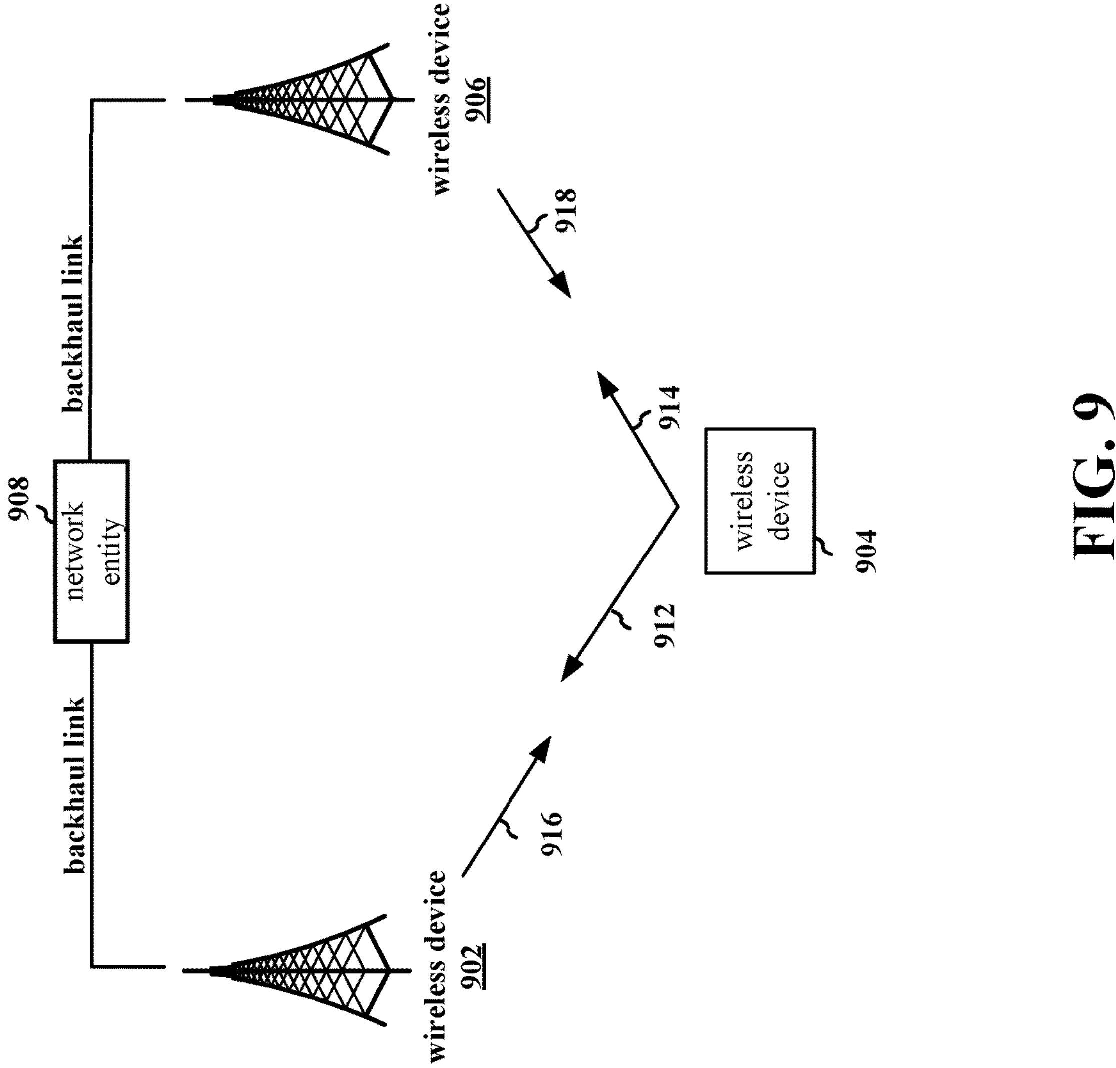
908
network entity
backhaul link
backhaul link
wireless device
906
wireless device
902
918
914
912
916
wireless device
904
FIG. 9
900

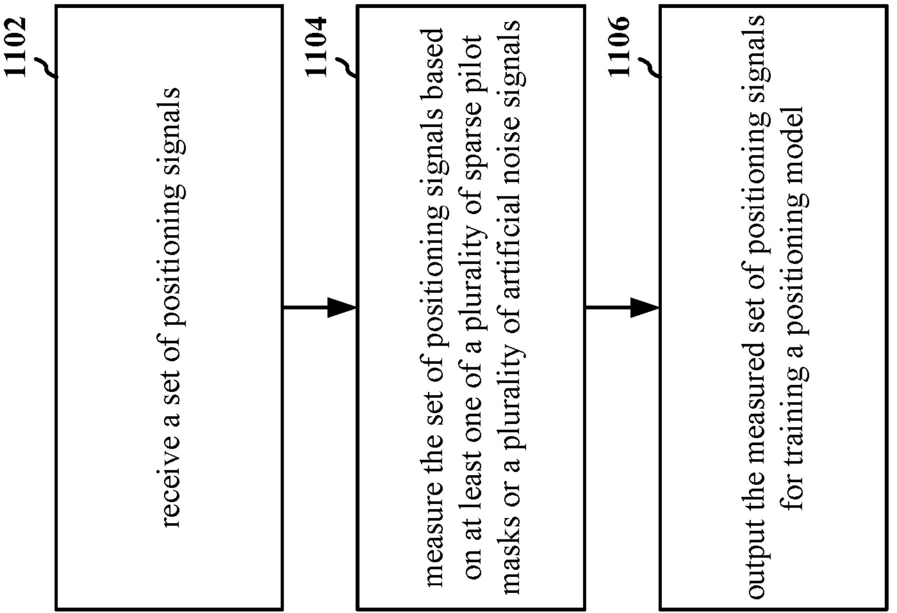
FIG. 11
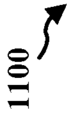

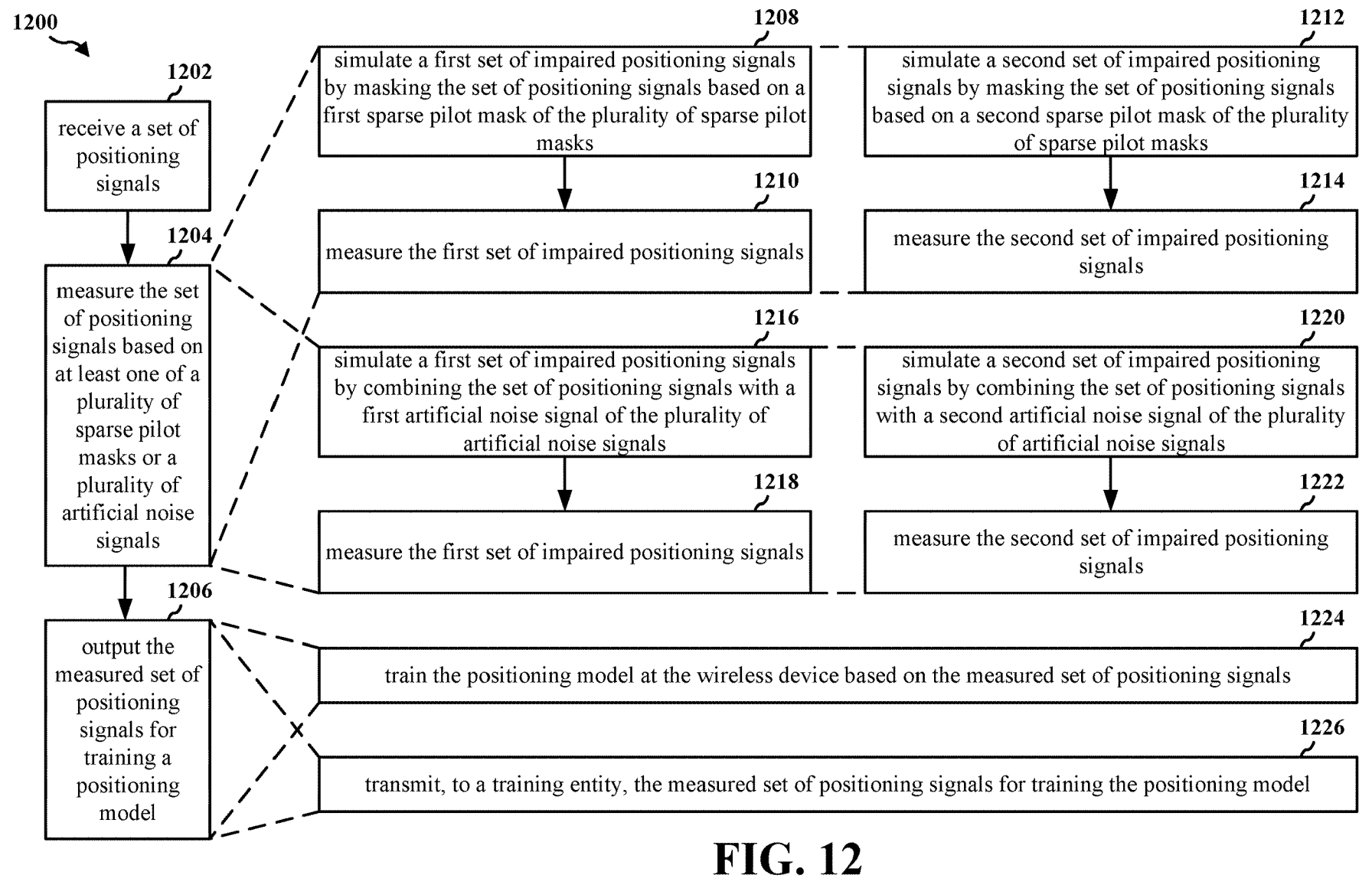

1200

1202 receive a set of positioning signals 1204 measure the set of positioning signals based on at least one of a plurality of sparse pilot masks or a plurality of artificial noise signals 1206 output the measured set of positioning signals for training a positioning model 1208 simulate a first set of impaired positioning signals by masking the set of positioning signals based on a first sparse pilot mask of the plurality of sparse pilot masks 1210 measure the first set of impaired positioning signals 1212 simulate a second set of impaired positioning signals by masking the set of positioning signals based on a second sparse pilot mask of the plurality of sparse pilot masks 1214 measure the second set of impaired positioning signals 1216 simulate a first set of impaired positioning signals by combining the set of positioning signals with a first artificial noise signal of the plurality of artificial noise signals 1218 measure the first set of impaired positioning signals 1220 simulate a second set of impaired positioning signals by combining the set of positioning signals with a second artificial noise signal of the plurality of artificial noise signals 1222 measure the second set of impaired positioning signals 1224 train the positioning model at the wireless device based on the measured set of positioning signals 1226 transmit, to a training entity, the measured set of positioning signals for training the positioning model

FIG. 12

1400

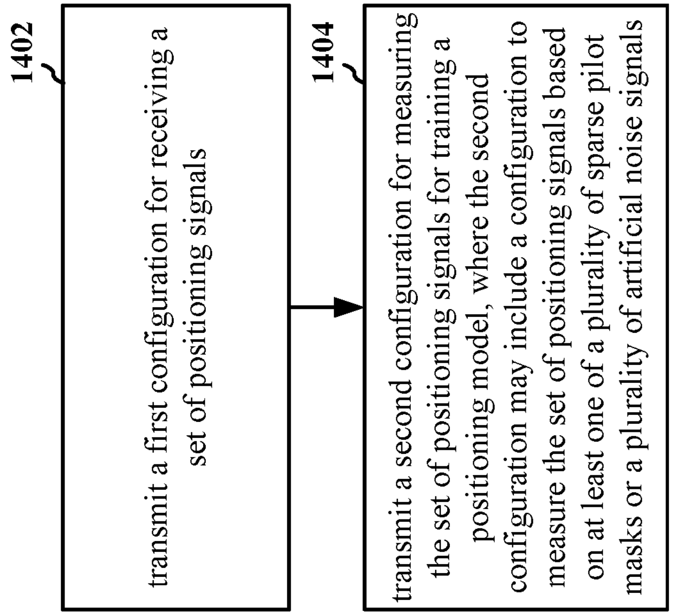
1402
transmit a first configuration for receiving a set of positioning signals
1404
transmit a second configuration for measuring the set of positioning signals for training a positioning model, where the second configuration may include a configuration to measure the set of positioning signals based on at least one of a plurality of sparse pilot masks or a plurality of artificial noise signals

FIG. 14

2000

POSITIONING TRAINING AND DATA COLLECTION WITH CHANNEL ESTIMATION ERRORS

TECHNICAL FIELD

The present disclosure relates generally to communication systems, and more particularly, to a system for performing positioning using radio frequency (RF) signals.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may include a wireless device. The wireless device may be a user equipment (UE) or a network node. The apparatus may receive a set of positioning signals. The apparatus may measure the set of positioning signals based on at least one of a plurality of sparse pilot masks or a plurality of artificial noise signals. The apparatus may output the measured set of positioning signals for training a positioning model. The apparatus may output the measured set of positioning signals for training a positioning model by training the positioning model at the wireless device based on the measured set of positioning signals. The apparatus may output the measured set of positioning signals for training a positioning model by transmitting, to a training entity, the measured set of positioning signals for training the positioning model.

In an aspect of the disclosure, a method, a computer-readable medium, and an apparatus are provided. The apparatus may include a network entity. The network entity may include a location management function (LMF). The apparatus may transmit a first configuration for receiving a set of positioning signals. The apparatus may transmit a second configuration for measuring the set of positioning signals for training a positioning model. The second configuration may include a configuration to measure the set of positioning signals based on at least one of a plurality of sparse pilot masks or a plurality of artificial noise signals.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 9 is a diagram illustrating an example of a network entity coordinating a plurality of base stations to perform positioning with a wireless device.

FIG. 11 is a flowchart of a method of wireless communication.

FIG. 12 is a flowchart of a method of wireless communication.

FIG. 14 is a flowchart of a method of wireless communication.

DETAILED DESCRIPTION

Figure 1:
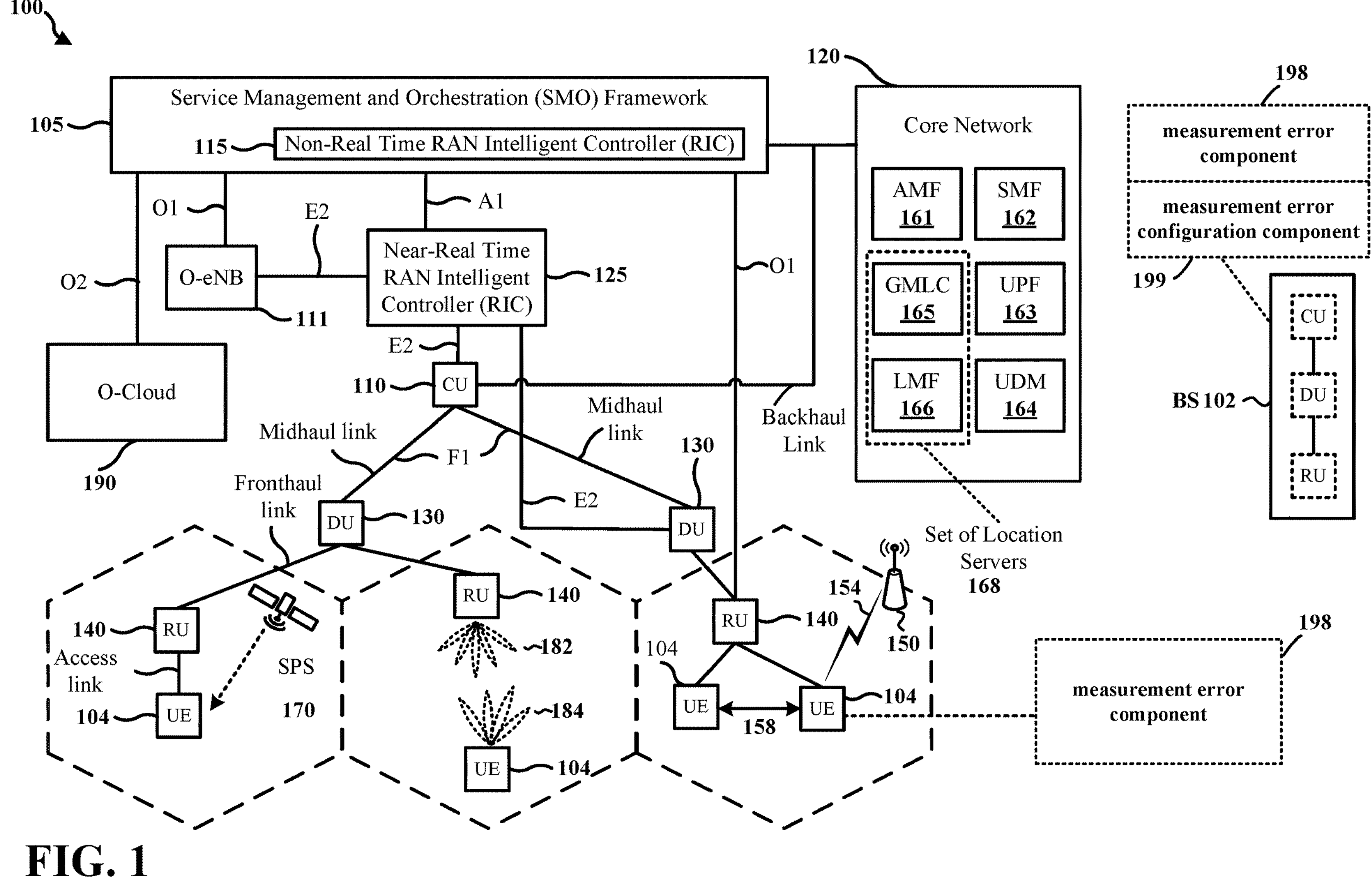
FIG. 1 is a diagram illustrating an example of a wireless communications system and an access network.

The following description is directed to examples for the purposes of describing innovative aspects of this disclosure. However, a person having ordinary skill in the art may recognize that the teachings herein may be applied in a multitude of ways. Some or all of the described examples may be implemented in any device, system or network that is capable of transmitting and receiving radio frequency (RF) signals according to one or more of the Institute of Electrical and Electronics Engineers (IEEE) 1402.11 standards, the IEEE 1402.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described examples may be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), spatial division multiple access (SDMA), rate-splitting multiple access (RSMA), multi-user shared access (MUSA), single-user (SU) multiple-input multiple-output (MIMO) and multi-user (MU)-MIMO. The described examples also may be implemented using other wireless communication protocols or RF signals suitable for use in one or more of a wireless personal area network (WPAN), a wireless local area network (WLAN), a wireless wide area network (WWAN), a wireless metropolitan area network (WMAN), or an internet of things (IoT) network.

Various aspects relate generally to wireless communication and more particularly to positioning for wireless devices. Some aspects more specifically relate to training positioning models for use in positioning for wireless devices. In some examples, a wireless device may be used to collect data for training a positioning model. The model may be an artificial intelligence (AI)/machine learning (ML) (AI/ML or AIML) positioning model trained using a set of inputs and a set of expected outputs, or labels. Such a positioning model may be used to calculate a new set of outputs based on a new set of inputs. The wireless device may include a user equipment (UE), a network node, or a positioning reference unit (PRU). In some aspects, a wireless device that collects measurements for training a positioning model may simulate a channel estimation error by altering how it measures a set of positioning signals that the wireless device receives. For example, the wireless device may measure a set of positioning signals based on a plurality of sparse pilot masks, such as by measuring every other symbol, or by measuring every fourth symbol. In another example, the wireless device may measure a set of positioning signals based on a plurality of artificial noise signals, such as by adding, subtracting or multiplying artificial noise to the set of positioning signals. By training a positioning model using positioning signals that have undergone simulated channel estimation error scenarios, the positioning model may calculate outputs more accurately when the positioning model performs calculations based on measurements of positioning signals that have been measured under conditions where channel estimation errors have occurred.

In some examples, the wireless device may receive a set of positioning signals, for example sounding reference signals (SRSs), positioning reference signals (PRSs), or channel state information (CSI) reference signals (CSI-RSs). The wireless device may measure the set of positioning signals based on at least one of a plurality of sparse pilot masks or a plurality of artificial noise signals. The wireless device may output the measured set of positioning signals for training a positioning model. For example, the wireless device may train the positioning model at the wireless device based on the measured set of positioning signals, or may transmit the measured set of positioning signals to a training entity for training the positioning model. In some examples, a network entity may transmit a first configuration for receiving a set of positioning signals. The network entity may transmit a second configuration for measuring the set of positioning signals for training a positioning model. The second configuration may include a configuration to measure the set of positioning signals based on at least one of a plurality of sparse pilot masks or a plurality of artificial noise signals. In some aspects, the first configuration and the second configuration may be transmitted within a single configuration message to a wireless device.

A target wireless device and a set of network nodes, such as next generation (NG) radio access network (NG-RAN) nodes, may use channel estimation through transmitting and measuring PRS and/or SRS. A positioning model may be trained using measurements of such positioning signals. A wireless device may be configured to take into account different issues with channel estimation while training the positioning model including noise, interference from adjacent cells, and/or usage of different channel estimation techniques by different targets. For example, one wireless device may use a minimum mean-square error (MMSE) channel estimation implementation while another wireless device uses a least-square (LS) channel estimation implementation or a likelihood based channel estimation implementation. In one aspect, a network entity, such as a location management function (LMF), may realize different instances of non-ideal channel estimations by configuring one or more training data collection entities (e.g., UE, PRU, next generation node B (gNB), transmission reception point (TRP)) to mimic different non-ideal channel estimation scenarios. A wireless device that receives and measures a set of positioning signals may be referred to as a training data collection entity. A plurality of training data collection entities may be from different vendors and may use different channel estimation implementations, such as different sparse positioning signal patterns. In one aspect, a network node may configure a positioning signal with a frequency comb pattern and/or symbol pattern. The training data collection entity may consider different subsets of pilots (i.e., sparse pattern pilots) in the pattern when estimating the channel. In some aspects, the subset of pilots to be considered may be configured by the network entity. For example, via a long term evolution (LTE) positioning protocol (LPP) message, or an LPP annex (LPPa) message for a UE, via an LPP message or an LPPa message for a PRU, via a new radio (NR) positioning protocol (NRPP) message, or an NRPP annex (NRPPa) message for an NG-RAN node, or via a different protocol or procedure. In one aspect, a wireless device (e.g., UE/PRU/NG-RAN node) may indicate its capability to a network entity (e.g., LMF) about collecting different instances/realizations for non-ideal channel estimations using a subset of pilots as part of capability exchange procedure (for an LPP message, or an LPPa protocol) or a TRP information exchange (for an NRPP message, or an NRPPa protocol). The capability message may indicate (1) a number of channel estimate realizations the device can support, (2) sparse patterns for positioning signal that may be supported, and/or (3) any measurement gap conditions/requirements. In some aspects, a number of realizations of channel estimations may depend on an expected signal-to-noise ratio (SNR) setting at a data collection entity. In some aspects, a network entity may configure a wireless device to add artificial noise when estimating the channel. The noise may be configured by the network entity, for example, via an LPP/LPPa message for a UE, via an LPP/LPPa message for a PRU, via an NRPP/NRPPa message for an NG-RAN node, or via a different protocol or procedure. In some aspects, a network entity may configure the wireless entity to jointly add artificial noise and also consider sparse positioning signal patterns when estimating the channel between a positioning target device and a positioning network node.

Particular aspects of the subject matter described in this disclosure may be implemented to realize one or more of the following potential advantages. In some examples, by configuring a wireless device to measure positioning signals based on at least one of a plurality of sparse pilot masks or a plurality of artificial noise signals, a positioning model may account for channel estimation impairments when collecting training data and applying training data to a positioning model for training. The wireless device may collect training data with multiple instances/realizations of model inputs that may be obtained with non-ideal channel estimation inputs. A network entity may realize different instances of non-ideal channel estimations by configuring the wireless device (e.g., UE, PRU, gNB, TRP) to construct multiple channel estimations for a given positioning resource. This way, the wireless device may mimic different non-ideal channel estimation scenarios. The wireless device may consider a sparse pilot representation when estimating the channel. The wireless device may add artificial noise when estimating the channel. The wireless device may consider a sparse pilot representation and may add artificial noise when estimating the channel. The network entity may consider each permutation of estimated instances with a large number of wireless entities that are from different vendors with potentially different channel estimation implementations. This may enrich the training data for a positioning model and may ensure that the model is robust to channel estimation errors and can be generalized for measurements that are received from wireless entities of different vendors.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor (s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (IFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHZ (e.g., 5, 10, 15, 20, 100, 400, etc. MHz) bandwidth per carrier allocated in a carrier aggregation of up to a total of Yx MHZ (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 1402.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHZ-7.125 GHZ) and FR2 (24.25 GHz-52.6 GHZ). Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHZ-71 GHZ), FR4 (71 GHz-114.25 GHZ), and FR5 (114.25 GHZ-300 GHz). Each of these higher frequency bands falls within the EHF band.

With the above aspects in mind, unless specifically stated otherwise, the term "sub-6 GHz" or the like if used herein may broadly represent frequencies that may be less than 6 GHZ, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 and/or the base station 102 may have a measurement error component 198 that may be configured to receive a set of positioning signals. The measurement error component 198 may be configured to measure the set of positioning signals based on at least one of a plurality of sparse pilot masks or a plurality of artificial noise signals. The measurement error component 198 may be configured to output the measured set of positioning signals for training a positioning model. In certain aspects, the base station 102 may have a measurement error configuration component 199 that may be configured to transmit a first configuration for receiving a set of positioning signals. The measurement error configuration component 199 may be configured to transmit a second configuration for measuring the set of positioning signals for training a positioning model. The second configuration may include a configuration to measure the set of positioning signals based on at least one of a plurality of sparse pilot masks or a plurality of artificial noise signals. One or more wireless devices configured to perform positioning, such as the UE 104 and a set of network nodes such as the base station 102, may have a measurement error component 198 configured to measure a set of received positioning signals with some level of simulated channel estimation error artifacts, such as a sparse pilot mask or an artificial noise signal. The measurement error component 198 may use the measured positioning signals with the simulated channel estimation error artifacts to train a positioning model to minimize errors in positioning measurements when actual channel estimation errors occur in live, non-test environments. The measurement error configuration component 199 may configure both the positioning occasion and the simulated channel estimation error artifacts.

Figures 2A, 2B, 2C, 2D:
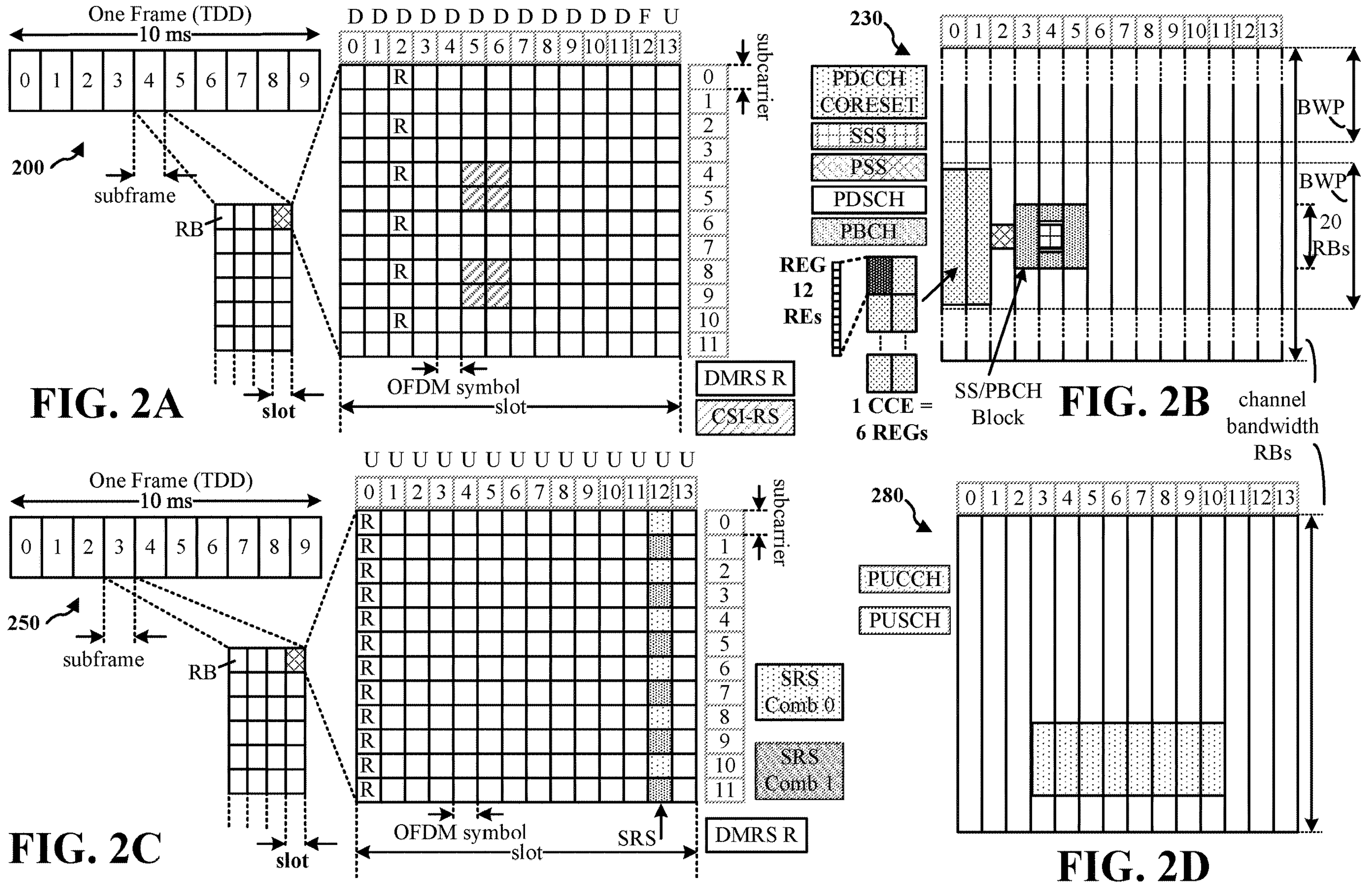
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| $\mu$ | SCS $\Delta f = 2^{\mu} \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 1860 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology u, there are 14 symbols/slot and 24 slots/subframe. The subcarrier spacing may be equal to $2^{\mu}*15$ kHz, where u is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
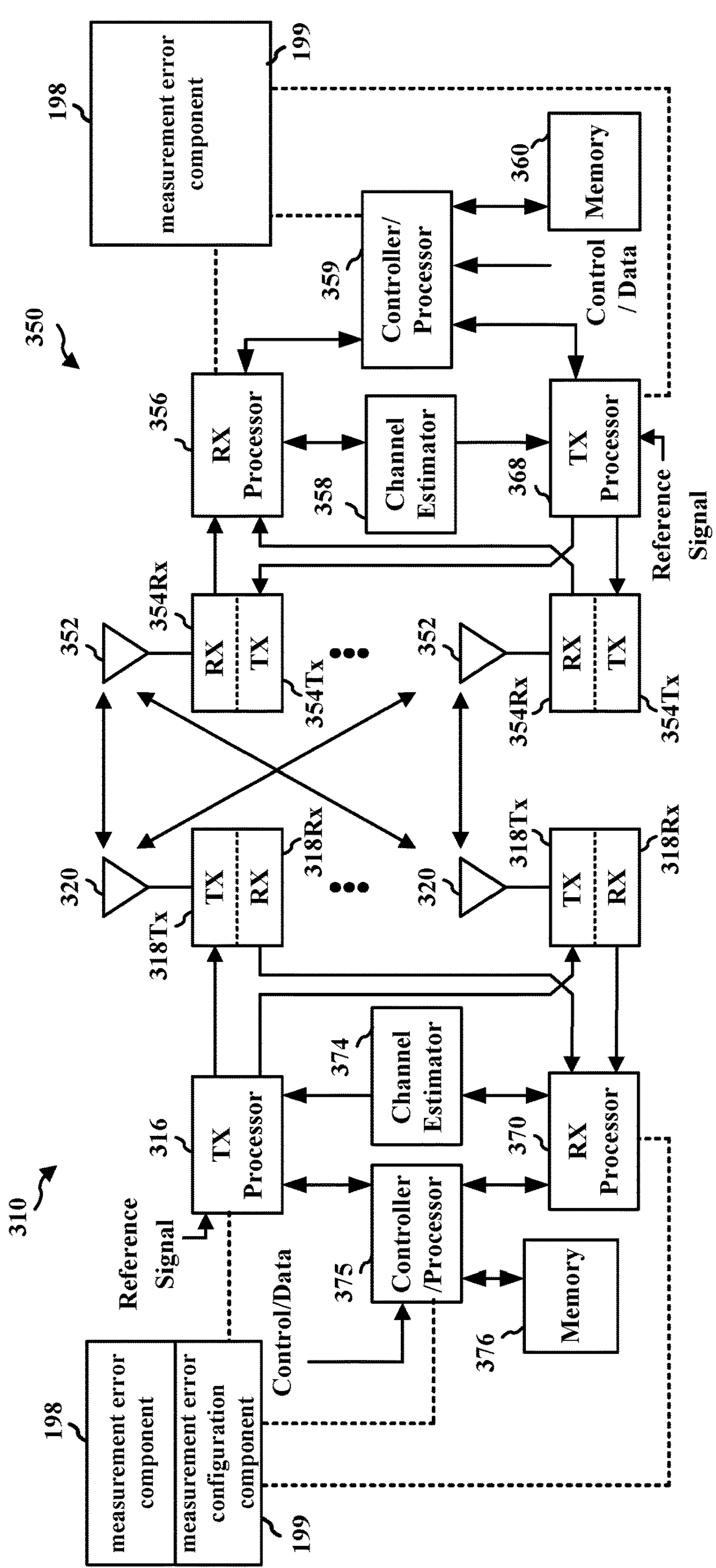
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the measurement error component 198 of FIG. 1.

At least one of the TX processor 316, the RX processor 370, and the controller/processor 375 may be configured to perform aspects in connection with the measurement error component 198 of FIG. 1.

At least one of the TX processor 316, the RX processor 370, and the controller/processor 375 may be configured to perform aspects in connection with the measurement error configuration component 199 of FIG. 1.

Figure 4:
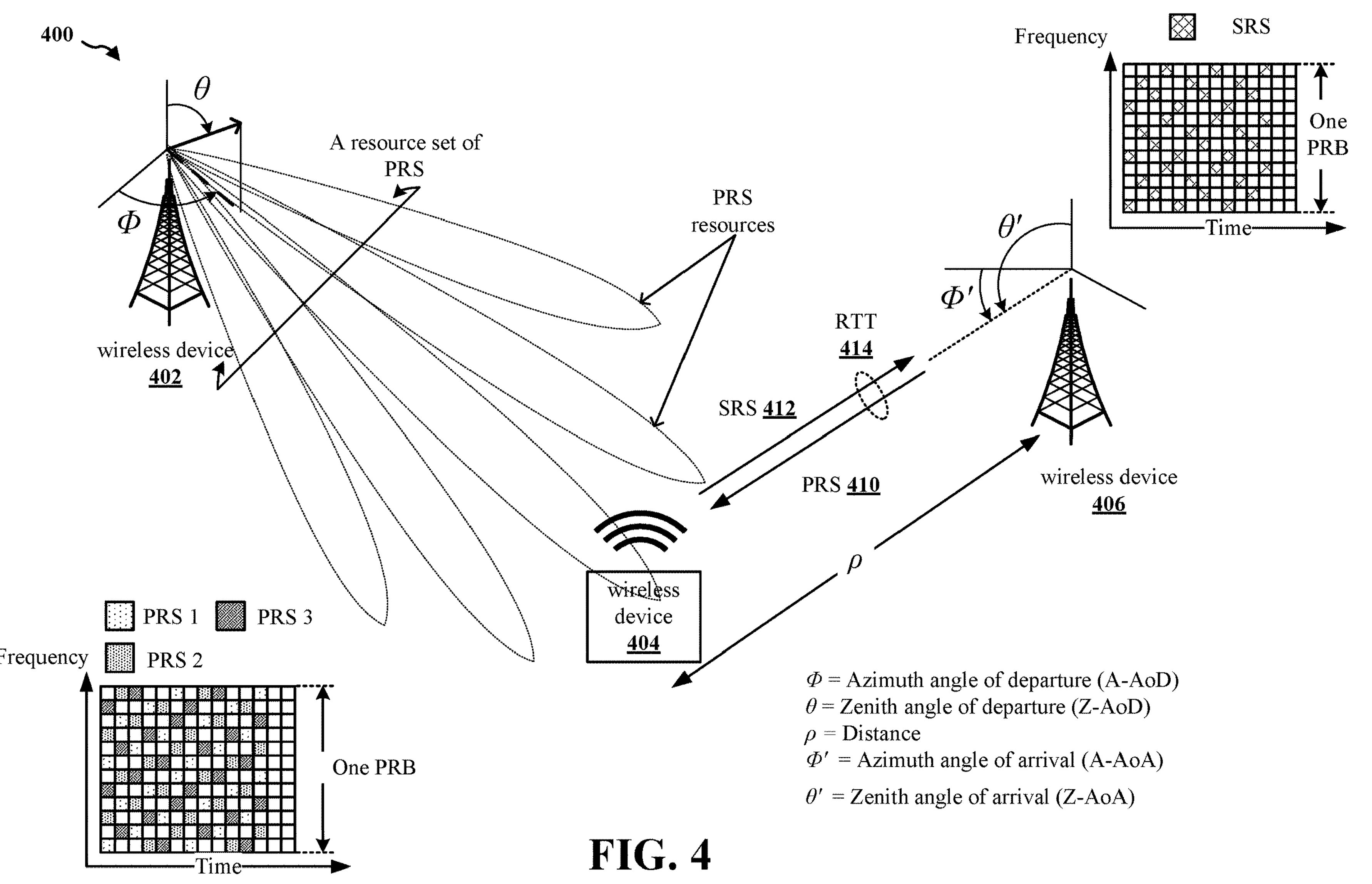
FIG. 4 is a diagram illustrating an example of positioning based on positioning signal measurements.

FIG. 4 is a diagram 400 illustrating an example of positioning based on reference signal measurements. The wireless device 402 may be a UE, a base station, or a positioning reference unit (PRU). The wireless device 404 may be a UE, a base station, or a PRU. The wireless device 406 may be a UE, a base station, or a PRU. The wireless device 402 may be referred to as a positioning target wireless device, whose location may be calculated based on measurements of one or more reference signals. The wireless device 404 and the wireless device 406 may be referred to as positioning neighbor wireless devices, whose locations may be known, which may be used to calculate the location of the wireless device 402. The wireless device 404 may transmit SRS 412 at time $T_{SRS\_TX}$ to the wireless device 406. The wireless device 404 may receive positioning reference signals (PRS) 410 at time $T_{PRS\_RX}$ from the wireless device 406. The SRS 412 may be an UL-SRS. The PRS 410 may be a DL-PRS. In some aspects, the wireless device 402 may be a TRP and the wireless device 406 may be a TRP, which may be both configured to transmit DL-PRS to the wireless device 404. The wireless device 404 may be a UE configured to transmit UL-SRS to the wireless device 402 and the wireless device 406.

The wireless device 406 may receive the SRS 412 at time $T_{SRS\_RX}$ from the wireless device 404 and transmit the PRS 410 at time $T_{PRS\_TX}$ to the wireless device 404. The wireless device 404 may receive the PRS 410 before transmitting the SRS 412. The wireless device 404 may transmit the SRS 412 before receiving the PRS 410. The wireless device 404 may transmit the SRS 412 in response to receiving the PRS 410. The wireless device 406 may transmit the PRS 410 in response to receiving the SRS 412. A positioning server (e.g., location server(s) 168), the wireless device 404, or the wireless device 406 may determine the round-trip-time (RTT) 414 based on $||T_{SRS\_RX}-T_{PRS\_TX}|-|T_{SRS\_TX}-T_{PRS\_RX}||$. Multi-RTT positioning may make use of the Rx-Tx time difference measurements (i.e., $|T_{SRS\_TX}-T_{PRS\_RX}|$) and PRS reference signal received power (RSRP) (PRS-RSRP) of PRS signals received from multiple wireless devices, such as the wireless device 402 and the wireless device 406, which are measured by the wireless device 404, and the measured Rx-Tx time difference measurements (i.e., $|T_{SRS\_RX}-T_{PRS\_TX}|$) and SRS-RSRP at multiple wireless devices, such as at the wireless device 402 and at the wireless device 406 of SRS transmitted from wireless device 404. The wireless device 404 may measure the Rx-Tx time difference measurements, and/or PRS-RSRP of the received signals, using assistance data received from the positioning server, the wireless device 402, and/or the wireless device 406. The wireless device 402 and the wireless device 406 may measure the Rx-Tx time difference measurements, and/or SRS-RSRP of the received signals, using assistance data received from the positioning server. The measurements may be used at the positioning server or the wireless device 404 to determine the RTT, which may be used to estimate the location of the wireless device 404. Other methods are possible for determining the RTT, such as for example using time-difference of arrival (TDOA) measurements, such as DL-TDOA and/or UL-TDOA measurements.

DL-AoD positioning may make use of the measured PRS-RSRP of signals transmitted from multiple wireless devices, such as the wireless device 402 and the wireless device 406, and received at the wireless device 404. The AoD positioning may also be referred to as DL-AoD positioning where the PRS are DL signals. The wireless device 404 may measure the PRS-RSRP of the received signals using assistance data received from the positioning server, and the resulting measurements may be used along with the azimuth angle of departure (A-AoD), the zenith angle of departure (Z-AoD), and other configuration information to locate the wireless device 404 in relation to the neighboring wireless devices that transmitted the PRS, such as the wireless device 402 and the wireless device 406.

DL-TDOA positioning may make use of the DL reference signal time difference (RSTD), and/or PRS-RSRP of signals received from multiple wireless devices, such as the wireless device 402 and the wireless device 406, at the wireless device 404. The wireless device 404 may measure the RSTD, and/or the PRS-RSRP, of the received PRS signals using assistance data received from the positioning server, and the resulting measurements may be used along with other configuration information to locate the wireless device 404 in relation to the neighboring wireless devices that transmitted the PRS, such as the wireless device 402 and the wireless device 406.

UL-TDOA positioning may make use of the UL relative time of arrival (RTOA), and/or SRS-RSRP, at multiple wireless devices, such as the wireless device 402 and the wireless device 406, of signals transmitted from the wireless device 404. The wireless devices, such as the wireless device 402 and the wireless device 406, may measure the RTOA, and/or the SRS-RSRP, of the received signals using assistance data received from the positioning server, and the resulting measurements may be used along with other configuration information to estimate the location of the wireless device 404.

UL-AoA positioning may make use of the measured azimuth angle of arrival (A-AoA) and zenith angle of arrival (Z-AoA) at multiple wireless devices, such as the wireless device 402 and the wireless device 406, of signals transmitted from the wireless device 404. The wireless device 402 and the wireless device 406 may measure the A-AoA and the Z-AoA of the received signals using assistance data received from the positioning server, and the resulting measurements may be used along with other configuration information to estimate the location of the wireless device 404. Additional positioning methods may be used for estimating the location of the wireless device 404, such as for example, UL-AoD and/or DL-AoA at the wireless device 404. Note that data/measurements from various technologies may be combined in various ways to increase accuracy, to determine and/or to enhance certainty, to supplement/complement measurements, and/or to substitute/provide for missing information.

Within a slot, a PRS resource may be configured to span a number of OFDM symbols (e.g., 2, 4, 6, or 12). With regards to a frequency domain pattern, a PRS resource may have a comb-like pattern. Potential combinations of comb-type and a number of symbols within a slot may be represented by the time/frequency patterns shown in Table 2.

TABLE 2

| PRS time/frequency patterns within a slot | | | | |
|---|---|---|---|---|
| | 2 symbols | 4 symbols | 6 symbols | 12 symbols |
| comb-2 | {0, 1} | {0, 1, 0, 1} | {0, 1, 0, 1, 0, 1} | {0, 1, 0, 1, 0, 1, 0, 1, 0, 1, 0, 1} |
| comb-4 | N/A | {0, 2, 1, 3} | N/A | {0, 2, 1, 3, 0, 2, 1, 3, 0, 2, 1, 3} |

TABLE 2-continued

| PRS time/frequency patterns within a slot | | | | |
|---|---|---|---|---|
| | 2 symbols | 4 symbols | 6 symbols | 12 symbols |
| comb-6 | N/A | N/A | {0, 3, 1, 4, 2, 5} | {0, 3, 1, 4, 2, 5, 0, 3, 1, 4, 2, 5} |
| comb-12 | N/A | N/A | N/A | (0, 6, 3, 9, 1, 7, 4, 10, 2, 8, 5, 11} |

Figures 5A, 5B, 5C, 5D, 5E:
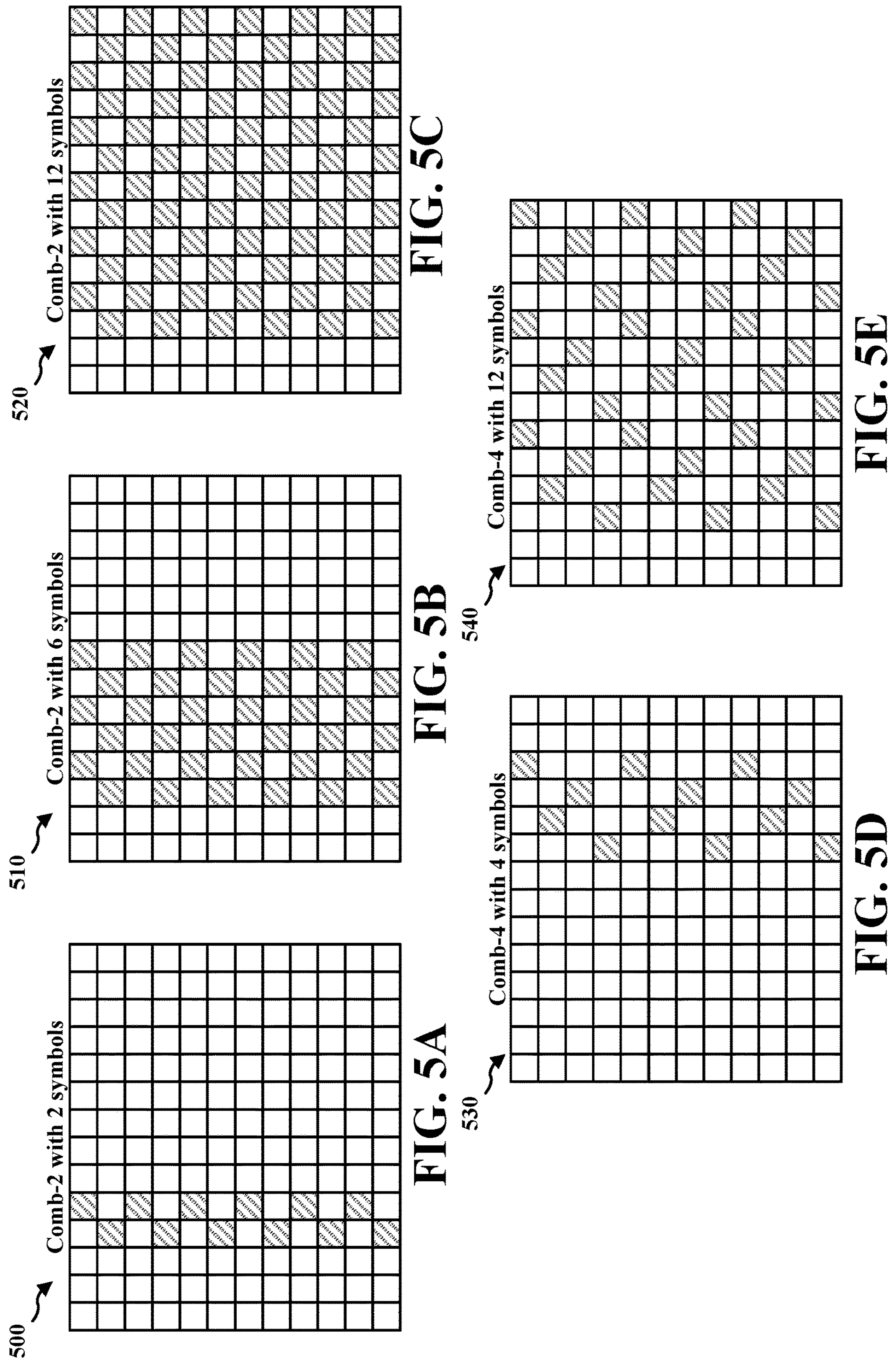
FIG. 5A-5E are diagrams illustrating examples of positioning signal patterns.
Figures 6A, 6B, 6C:
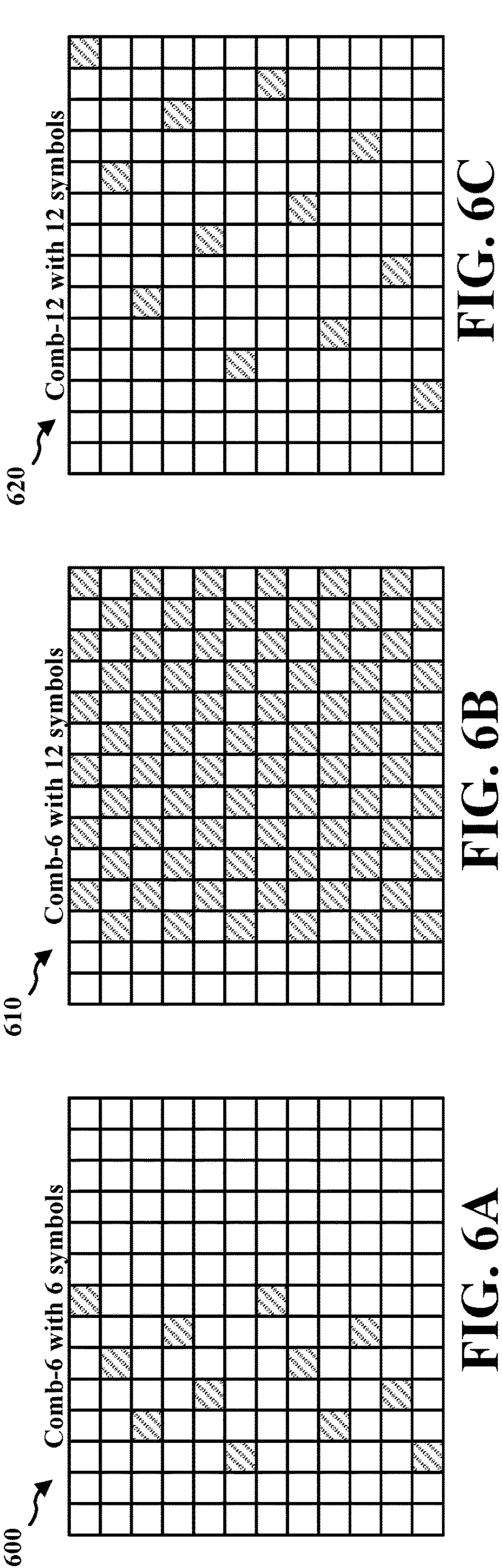
FIG. 6A-6C are diagrams illustrating examples of positioning signal patterns.

FIGS. 5A-5E and FIGS. 6A-6C are diagrams illustrating examples of PRS patterns. Each block in a PRS pattern may represent an information element (IE) in a set of resources. FIG. 5A is a diagram 500 of a PRS signal having a time/frequency pattern of comb-2 with 2 symbols. FIG. 5B is a diagram 510 of a PRS signal having a time/frequency pattern of comb-2 with 6 symbols. FIG. 5C is a diagram 520 of a PRS signal having a time/frequency pattern of comb-2 with 12 symbols. FIG. 5D is a diagram 530 of a PRS signal having a time/frequency pattern of comb-4 with 4 symbols. FIG. 5E is a diagram 540 of a PRS signal having a time/frequency pattern of comb-2 with 12 symbols. FIG. 6A is a diagram 600 of a PRS signal having a time/frequency pattern of comb-6 with 6 symbols. FIG. 6B is a diagram 610 of a PRS signal having a time/frequency pattern of comb-6 with 12 symbols. FIG. 6C is a diagram 620 of a PRS signal having a time/frequency pattern of comb-12 with 12 symbols.

Within a slot, an SRS resource may also be configured to span a number of OFDM symbols (e.g., 2, 4, 6, or 12). With regards to a frequency domain pattern, an SRS resource may also have a comb-like pattern. Potential combinations of comb-type and a number of symbols within a slot may be represented by the time/frequency patterns shown in Table 3.

TABLE 2

| PRS time/frequency patterns within a slot | | | | | |
|---|---|---|---|---|---|
| | 1 symbol | 2 symbols | 4 symbols | 8 symbols | 12 symbols |
| comb-2 | {0} | {0, 1} | {0, 1, 0, 1} | N/A | N/A |
| comb-4 | N/A | {0, 2} | {0, 2, 1, 3} | {0, 2, 1, 3, 0, 2, 1, 3} | {0, 2, 1, 3, 0, 2, 1, 3, 0, 2, 1, 3} |
| comb-8 | N/A | N/A | (0, 4, 2, 6} | {0, 4, 2, 6, 1, 5, 3, 7} | {0, 4, 2, 6, 1, 5, 3, 7, 0, 4, 2, 6} |

Figures 7A, 7B, 7C, 7D, 7E, 7F:
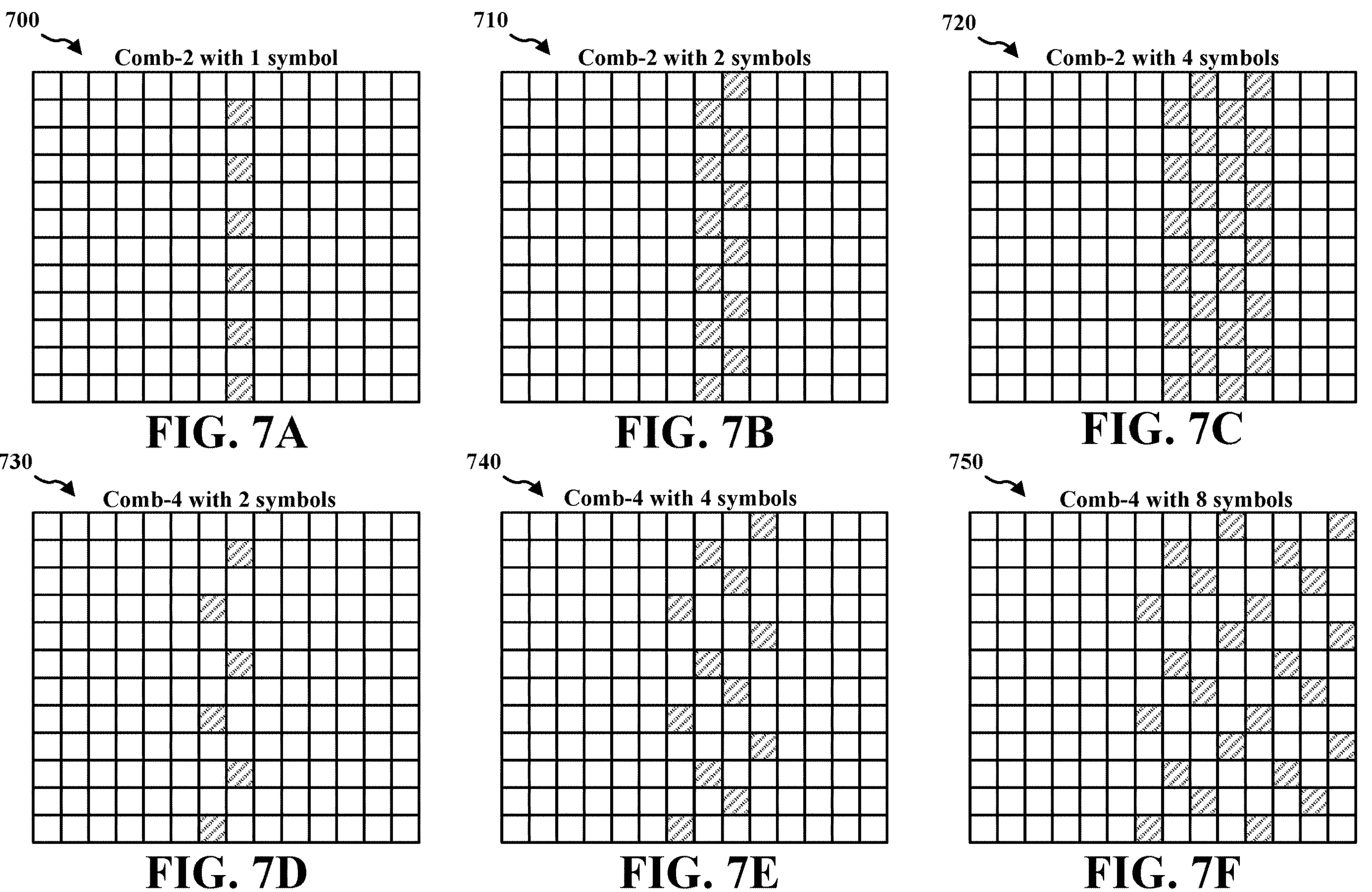
FIG. 7A-7F are diagrams illustrating examples of positioning signal patterns.
Figures 8A, 8B, 8C:
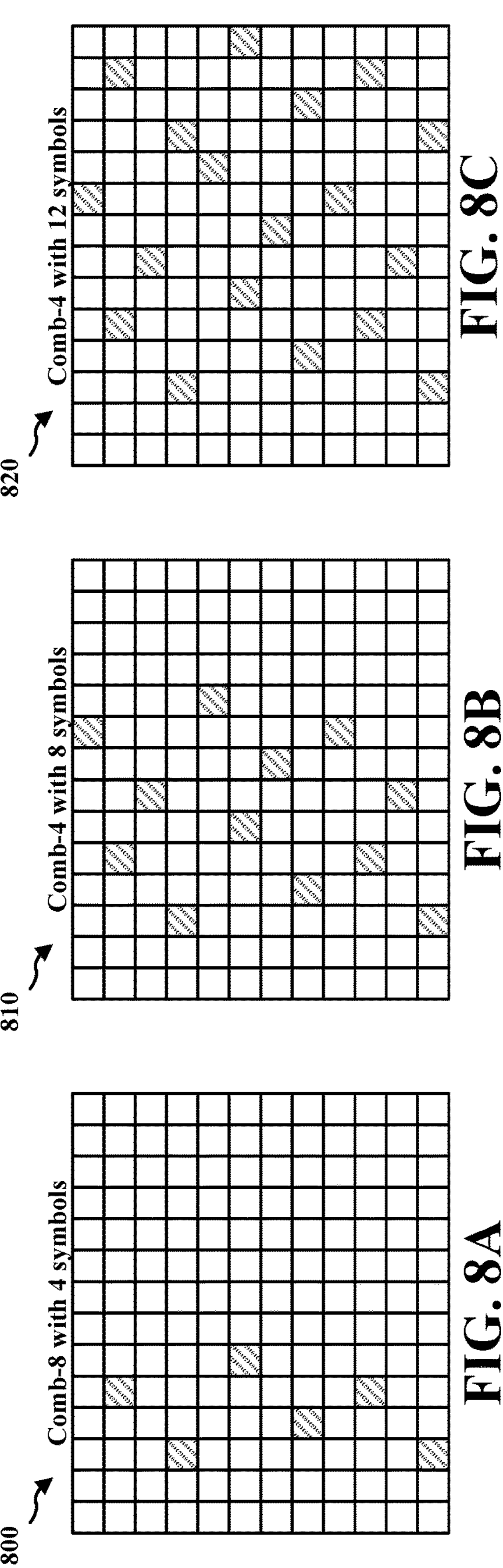
FIG. 8A-8C are diagrams illustrating examples of positioning signal patterns.

FIGS. 7A-7F and FIGS. 8A-8C are diagrams illustrating examples of SRS patterns. Each block in an SRS pattern may represent an IE in a set of resources. FIG. 7A is a diagram 700 of an SRS signal having a time/frequency pattern of comb-2 with 1 symbol. FIG. 7B is a diagram 710 of an SRS signal having a time/frequency pattern of comb-2 with 2 symbols. FIG. 7C is a diagram 720 of an SRS signal having a time/frequency pattern of comb-2 with 4 symbols. FIG. 7D is a diagram 730 of an SRS signal having a time/frequency pattern of comb-4 with 2 symbols. FIG. 7E is a diagram 740 of an SRS signal having a time/frequency pattern of comb-4 with 4 symbols. FIG. 7F is a diagram 750 of an SRS signal having a time/frequency pattern of comb-4 with 8 symbols. FIG. 8A is a diagram 800 of an SRS signal having a time/frequency pattern of comb-8 with 4 symbols. FIG. 8B is a diagram 810 of an SRS signal having a time/frequency pattern of comb-4 with 8 symbols. FIG. 8C is a diagram 820 of an SRS signal having a time/frequency pattern of comb-4 with 12 symbols.

FIG. 9 is a diagram 900 illustrating a network entity 908 that may be configured to coordinate a wireless device 902 and a wireless device 906 to perform positioning with a wireless device 904. The location of the wireless device 902 and the wireless device 906 may be known. The wireless device 902 may be a base station, a gNB, or a TRP. The wireless device 906 may be a base station, a gNB, or a TRP. The wireless device 904 may be a UE or a PRU. The network entity 908 may be connected to the wireless device 902 and the wireless device 906 via a physical link, for example a backhaul link or a midhaul link, or via a wireless link, such as an air interface (Uu) link. The network entity 908 may be part of a core network, such as an LMF or a set of location servers. The network entity 908 may configure positioning occasions between the wireless device 902, the wireless device 904, and the wireless device 906.

To perform positioning, the network entity 908 may configure the wireless devices to transmit positioning signals at one another. For example, the wireless device 904 may transmit the set of positioning signals 912 at the wireless device 902. The set of positioning signals 912 may be a set of SRSs. The wireless device 902 may measure the set of positioning signals 912. The wireless device 902 may transmit the set of positioning signals 916 at the wireless device 904. The set of positioning signals 916 may be a set of PRSs, such as the PRS patterns shown in FIG. 5A-5E or 6A-6C. The wireless device 904 may measure the set of positioning signals 916. The wireless device 904 may transmit a set of positioning signals 914 at the wireless device 906. The set of positioning signals 914 may be a set of SRSs, such as the SRS patterns shown in FIG. 7A-7E or 8A-8C. The wireless device 906 may measure the set of positioning signals 914. The wireless device 906 may transmit a set of positioning signals 918 at the wireless device 904. The set of positioning signals 918 may be a set of PRSs. The wireless device 904 may measure the set of positioning signals 918. One or more of the wireless devices may measure the received positioning signals to calculate a positioning measurement that may be used to calculate a location of the wireless device 904, or may be used to calculate a position or a location of the wireless device 904. For example, if the location of the wireless device 902 and the location of the wireless device 906 are known, the location of the wireless device 904 may be calculated based on a RTT between the wireless device 902 and the wireless device 904, and a RTT between the wireless device 904 and the wireless device 906. In another example, the wireless device 904 may calculate an angle of arrival (AoA) or an angle of departure (AoD) of the set of positioning signals 916, and may calculate an AoA or an AoD of the set of positioning signals 918. The calculated AoAs and/or AoDs may be used to calculate a position of the wireless device 904 if the location of the wireless device 902 and the location of the wireless device 906 are also known. Other measurements, such as RTOA, line-of-sight (LOS) identification (identifying whether there is a direct line-of-sight path between wireless devices), or multi-cell round trip time (multi-RTT) calculations may be performed to calculate the position of the wireless device 904, or to calculate a measurement that may be used to calculate the position of the wireless device 904.

In some aspects, a positioning model may be used to calculate one or more positioning metrics based on the measurements. For example, based on the measurements of positioning signals, a positioning model may calculate a location of the wireless device 904 or an intermediate measurement that may be used to calculate the location of the wireless device 904. A positioning model may be trained using artificial intelligence (AI)/machine learning (ML) (AI/ML or AIML), based on a set of inputs (e.g., measurements of positioning signals, assistance information associated with the positioning signals) and a set of labels. A positioning signal may include PRS, SRS, CSI-RS, or SSB. A measurement may be a channel impulse response (CIR) or other measurement used for performing positioning on a target wireless device. A label may be a calculated, derived, or given (i.e., known) expected result associated with a set of inputs, such as a location of the wireless device 904 or an intermediate measurement (e.g., a timing measurement, an angle measurement, a LOS identification) that may be used to calculate the location of the wireless device 904. A set of inputs and a set of labels may be used for generating and/or training a positioning model using AI/ML.

When training a positioning model, measurements of positioning signals as inputs, clean or noisy labels (clean labels may have a quality metric greater or equal to a threshold, noisy labels may have a quality metric less than or equal to the threshold) as expected outputs, and training data assistance information as inputs or expected outputs. The positioning model may operate on any wireless device based on a set of inputs. For example, the wireless device 904 may have a positioning model configured to accept a set of positioning measurements and generate an estimate of a location of the wireless device 904. In another example, the wireless device 904 may have a positioning model configured to accept a set of positioning measurements and generate an intermediate measurement (e.g., a timing measurement, an angle measurement, a LOS identification) that may be used (by the wireless device 904, or another entity, such as the network entity 908, the wireless device 902, or the wireless device 906) to calculate the location of the wireless device 904. In another example, the wireless device 902 or the wireless device 906 may have a positioning model configured to accept a set of positioning measurements and generate an estimate of a location of the wireless device 904. In another example, the wireless device 902 or the wireless device 906 may have a positioning model configured to accept a set of positioning measurements and generate an intermediate measurement that may be used to calculate the location of the wireless device 904. In another example, the network entity 908 may have a positioning model configured to accept a set of positioning measurements and generate an estimate of a location of the wireless device 904. In some aspects, the positioning measurements may be measured by the entity with the positioning model, for example the wireless device 904 may measure the set of positioning signals 916 and may measure the set of positioning signals 918, and may use those measurements as inputs to a positioning model at the wireless device 904. In some aspects, the positioning measurements may be measured and aggregated by the entity with the positioning model, for example the wireless device 902 may measure the set of positioning signals 912, and may aggregate measurements from the wireless device 906 and/or the wireless device 904 to use as inputs to a positioning model. In some aspects, the positioning measurements may be aggregated by the entity with the positioning model. For example, the network entity 908 may aggregate measurements from the wireless device 902, the wireless device 904, and the wireless device 906 to use as inputs to a positioning model.

A positioning model may be trained on a wireless device that performs positioning, such as the wireless device 902, the wireless device 904, the wireless device 906 and/or the network entity 908, or may be trained on an offline device, such as an over-the-top (OTT) server. The inputs to the positioning model may include measurements of positioning signals, such as measurements of SRS, PRS, CSI-RS, and/or SSB. The inputs to the positioning model may include assistance information associated with the measured positioning signals, such as BWP of a positioning signal resource, number of TRPs, beam information, positioning signal configuration). The labels/outputs for the positioning model may include an estimated location, such as an estimated location of the wireless device 904, or an intermediate measurement, such as an indication of whether there is a LOS path between the wireless device 902 and the wireless device 904.

In order to construct input measurements for a positioning model, a wireless device may estimate a channel between a positioning target wireless device and a positioning neighbor wireless device. The wireless device may estimate the channel based on a positioning signal, such as a PRS, a SRS, a CSI-RS, and/or an SSB. The channel estimation may be non-ideal and noisy due to the implementation. The channel estimation may be subject to interference coming from an adjacent cell. Different wireless devices may also implement different channel estimation techniques. For example, a first wireless device performing positioning with the wireless device 902 and the wireless device 906 may perform a different channel estimation technique than a second wireless device performing positioning with the wireless device 902 and the wireless device 906. This may create heterogeneity in collected training data. In addition, a channel estimation performed under ideal conditions may be different from a channel estimation performed under conditions where the channel estimation may be impaired. In some aspects, simulated channel estimation impairments may be used to train a positioning model to account for such non-ideal, noisy, and/or impaired positioning signal measurements. A channel estimation impairment may be simulated by measuring a positioning signal using a plurality of sparse pilot masks that mask at least some of the received positioning signal, and/or by measuring a positioning signal using a plurality of artificial noise signals that are combined with the received positioning signal.

A wireless device may transmit assistance information to an LMF or a training entity along with measurements and/or labels for training a positioning model. The assistance information may include, for example, a BWP used for a PRS, a number of TRPs transmitting sets of PRSs at the wireless device, beam information, and/or PRS configuration information. The assistance information may include an indication of reference signal resources used by the wireless device to derive and/or calculate the positioning signal measurements (e.g., frame number, slot index, orthogonal frequency division multiplexing (OFDM) symbol, hyper frame number). The assistance information may include enhanced timestamping of reference signal resources used by the wireless device to derive and/or calculate the positioning signal measurements (e.g., coordinated universal time (UTC) timing). The assistance information may include proprietary information associated with the wireless device, such as UE-side beam information used to obtain measurements and/or calculate labels. The assistance information may include an indication of reference signal resources used to obtain, derive, and/or calculate the location of the wireless device using RAT methods (e.g., frame number, slot index, OFDM symbol, hyper frame number). The assistance information may include enhanced timestamping of reference signal resources used to obtain, derive, and/or calculate the location of the wireless device using any RAT or non-RAT methods (e.g., UTC timing). The wireless device may transmit such assistance information in response to a request to provide assistance information for training a positioning model.

A network entity (e.g., an LMF) may transmit assistance information to the wireless device or a training entity along with measurements and/or labels for training a positioning model. Such assistance information may include an indication of reference signal resources that the network entity or another wireless device used to obtain, derive, and/or calculate the location of the wireless device or intermediate labels using RAT methods (e.g., frame number, slot index, OFDM symbol, hyper frame number). The assistance information may include enhanced timestamping of reference signal resources that the network entity or another wireless device used to obtain, derive, and/or calculate the location of the wireless device or intermediate labels using RAT methods or non-RAT methods (e.g., UTC timing). The assistance information may include network node (e.g., gNB, TRP) proprietary information (e.g., TRP-side beam information) used by the network entity or another wireless device to obtain, derive, and/or calculate the location of the wireless device or intermediate labels. The network entity may obtain the labels (location of the wireless device or intermediate labels) by calculating the labels, or by receiving a transmission including at least some of the labels from another wireless device. The network entity may transmit such assistance information in response to a request to provide assistance information for training a positioning model.

The labels may include a known location of a wireless device (e.g., a location of a PRU known by an LMF), a location of a wireless device obtained using a non-RAT method (e.g., using an LIDAR sensor, a GNSS fix, a WLAN positioning method, other sensors at the wireless device), a location of a wireless device calculated using a RAT method (e.g., based on DL-TDoA, DL-AOD, multi-RTT, and/or a set of intermediate labels calculated based on RAT measurements. The labels may be calculated/obtained by the wireless device, or may be received from a network entity, such as an LMF. The LMF may calculate a label based on measurements/labels received from the wireless device, may calculate a label based on measurements/labels received from other wireless devices (e.g., other TRPs and/or other network nodes in a multi-RTT session), or may obtain a label from another wireless device and transmit it to a training entity for training a positioning model.

Some wireless devices may not support signaling for collecting training data to train positioning models based on measurements taken of downlink reference signals. Some wireless devices may also not support transmitting certain labeling assistance information due to privacy limitations (e.g., a base station may not be configured to transmit its location or beam information to a first set of wireless devices, but may be configured to transmit its location or beam information to a second set of wireless devices). In some aspects, wireless devices may be configured to report training data measurements, a subset of assistance information, and/or labels to one another to support training positioning models based on downlink signals. In some aspects, a wireless device may request another wireless device to assist in training data collection. For example, the wireless device 904 may transmit a request to the network entity 908 to assist in training data collection as part of an LPPa framework. In some aspects, the wireless device 904 may request the network entity 908 to configure a positioning procedure (e.g., DL-TDoA, DL-AOD, multi-RTT) and in response the network entity 908 may provide labels and/or assistance information as part of configuring the requested positioning procedure. In some aspects, the wireless device 904 may request the network entity 908 to perform a dedicated procedure for collecting training data (e.g., as part of the LPPa framework for the wireless device). For example, the wireless device 904 may transmit an indication to the network entity 908 to train a positioning model for use by the wireless device 904 to calculate a location of the wireless device 904 or to calculate intermediate measurements that may be used to calculate a location of the wireless device 904. In another example, the network entity 908 may request the wireless device 904 to assist in training data collection as part of an LPPa framework. In some aspects, the network entity 908 may request the wireless device 904 to perform a positioning procedure (e.g., DL-TDoA, DL-AoD, multi-RTT) and in response the wireless device 904 may provide labels and/or assistance information as part of performing the requested positioning procedure. In some aspects, the network entity 908 may request the wireless device 904 to perform a dedicated procedure for collecting training data (e.g., as part of the LPPa framework for the wireless device). For example, the network entity 908 may transmit an indication to the wireless device 904 to provide measurements and assistance data to the network entity 908 or to another training entity (e.g., an over-the-top (OTT) server) to train a positioning model for use by the network entity 908 or the wireless device 904 to calculate a location of the wireless device 904 or to calculate intermediate measurements that may be used to calculate a location of the wireless device 904. In other words, training data collection sessions between a wireless device and a network entity may be initiated by the wireless device (e.g., a UE or a PRU may initiate the training data collection as part of LPPa signaling) or may be initiated by the network entity (e.g., an LMF may initiate the training data collection as part of LPPa signaling). A training data collection session between a wireless device and a network entity may be configured to enable the wireless device and the network entity to exchange assistance information as part of a session capability exchange, a session configuration exchange, a session initiation message, a session error message, a session pause message, and/or a session termination message.

In one aspect, a system may be configured to train a positioning model at the wireless device 904. For example, the wireless device 904 may have a positioning model configured to calculate a location of the wireless device 904 based on a set of inputs. The wireless device 904 may train the positioning model based on a calculated location of the wireless device 904 and a set of inputs, such as measurements of the set of positioning signals 916 received at the wireless device 904, measurements of the set of positioning signals 918 received at the wireless device 904, intermediate measurements calculated at the wireless device 904, intermediate measurements calculated at the wireless device 902, intermediate measurements calculated at the wireless device 906, intermediate measurements calculated at the network entity 908, assistance information associated with the set of positioning signals 916 or the set of positioning signals 912 at the wireless device 902, assistance information associated with the set of positioning signals 918 or the set of positioning signals 914 at the wireless device 902, and/or assistance information associated with the set of positioning signals 916, the set of positioning signals 912, the set of positioning signals 918, or the set of positioning signals 914 at the network entity 908. The location of the wireless device 904 may be calculated at the network entity 908, the wireless device 902, the wireless device 906, or the wireless device 904. For example, the network entity 908 may receive measurements from the wireless device 902, the wireless device 906, and the wireless device 904 and may calculate a position of the wireless device 904, or the wireless device 904 may calculate its position using a set of signals received by a LIDAR device, a GNSS device, or a WLAN antenna. After the positioning model is trained, the wireless device 902 may transmit the set of positioning signals 916 at the wireless device 904 and the wireless device 906 may transmit the set of positioning signals 918 at the wireless device 904. The wireless device 904 may measure the set of positioning signals 916 and the set of positioning signals 918. The wireless device 904 may receive assistance information from the wireless device 902, the wireless device 904, and/or the network entity 908. The wireless device 904 may use the positioning model to calculate its location, and may transmit its location to the network entity 908. In some aspects, the wireless device 904 may be used to generate a positioning model that may be used by another UE or PRU in an area about where the wireless device 904 was trained (e.g., a zone, a similar environment).

In another example, the wireless device 904 may have a positioning model configured to calculate an intermediate measurement that may be used to calculate a position of the wireless device 904 based on a set of inputs. The wireless device 904 may train the positioning model based on a calculated intermediate measurement (e.g., timing measurements, angle measurements, LOS identification) and a set of inputs, such as measurements of the set of positioning signals 916 received at the wireless device 904, measurements of the set of positioning signals 918 received at the wireless device 904, intermediate measurements calculated at the wireless device 904, intermediate measurements calculated at the wireless device 902, intermediate measurements calculated at the wireless device 906, intermediate measurements calculated at the network entity 908, assistance information (e.g., BWP, number of TRPs, beam information, PRS configuration information) associated with the set of positioning signals 916 or the set of positioning signals 912 at the wireless device 902, assistance information associated with the set of positioning signals 918 or the set of positioning signals 914 at the wireless device 902, assistance information associated with the set of positioning signals 916, the set of positioning signals 912, the set of positioning signals 918, or the set of positioning signals 914 at the network entity 908, and/or the location of the wireless device 904. After the positioning model is trained, the wireless device 902 may transmit the set of positioning signals 916 at the wireless device 904 and the wireless device 906 may transmit the set of positioning signals 918 at the wireless device 904. The wireless device 904 may measure the set of positioning signals 916 and the set of positioning signals 918. The wireless device 904 may receive assistance information from the wireless device 902, the wireless device 904, and/or the network entity 908. The wireless device 904 may use the positioning model to calculate a set of intermediate measurements that the wireless device 904 may use to calculate its location, and may transmit its location to the network entity 908. In another aspect, the wireless device 904 may transmit the set of intermediate measurements to the network entity 908, and the network entity 908 may calculate the position of the wireless device 904. The network entity 908 may not transmit as much assistance information to the wireless device 904 as when the wireless device 904 calculates its own location using the intermediate measurements from the positioning model, minimizing the amount of assistance information transmitted to the wireless device 904 for its positioning model. In some aspects, the wireless device 904 may be used to generate a positioning model that may be used by another UE or PRU in an area about where the wireless device 904 was trained.

In another aspect, a system may be configured to train a positioning model at the network entity 908. For example, the network entity 908 may have a positioning model configured to calculate a location of the wireless device 904 based on a set of inputs. The network entity 908 may train the positioning model based on a calculated location of the wireless device 904 and a set of inputs, such as measurements of the set of positioning signals 916 received at the wireless device 904, measurements of the set of positioning signals 918 received at the wireless device 904, measurements of the set of positioning signals 912 received at the wireless device 902, measurements of the set of positioning signals 914 received at the wireless device 906, intermediate measurements calculated at the wireless device 904, intermediate measurements calculated at the wireless device 902, intermediate measurements calculated at the wireless device 906, intermediate measurements calculated at the network entity 908, assistance information associated with the set of positioning signals 916 or the set of positioning signals 912 at the wireless device 902, assistance information associated with the set of positioning signals 918 or the set of positioning signals 914 at the wireless device 902, and/or assistance information associated with the set of positioning signals 916, the set of positioning signals 912, the set of positioning signals 918, or the set of positioning signals 914 at the network entity 908. The location of the wireless device 904 may be calculated at the network entity 908, the wireless device 902, the wireless device 906, or the wireless device 904. After the positioning model is trained, the wireless device 902 may transmit the set of positioning signals 916 at the wireless device 904 and the wireless device 906 may transmit the set of positioning signals 918 at the wireless device 904. The wireless device 904 may measure the set of positioning signals 916 and the set of positioning signals 918. The wireless device 904 may transmit its measurements to the network entity 908. The network entity may then calculate a location of the wireless device 904 based on the received measurements and any assistance information and/or measurements received by other devices, such as the measurements of the set of positioning signals 912 from the wireless device 904 measured by the wireless device 902 or the set of positioning signals 914 from the wireless device 904 measured by the wireless device 906. The network entity 908 may use the positioning model to calculate the location of the wireless device 904. In some aspects, the wireless device 904 may be used to generate a positioning model that may be used by the network entity 908 to calculate a location of another UE or PRU in an area about where the wireless device 904 was trained.

In some aspects, the wireless device 904 may initiate the training collection. For example, the wireless device 904 may transmit a request to the network entity 908 to provide its capability to be involved in a training data collection session and to provide labeling assistance and/or other network-side related assistance information (e.g., TRP beam configurations, location information, mapping for PRS resources to TRP locations and/or resource beams). The request message may include an indication for a request for the type of labeling assistance that the network entity 908 may provide (e.g., provide labels for a location of the wireless device 904, provide labels for intermediate measurements that may be used to calculate the location of the wireless device 904). In response to the request message, the network entity 908 may transmit an indication of its capability to assist the wireless device 904 in collecting training data and in providing labeling assistance (e.g., the network entity 908 may leverage the estimated/calculated/known location of the wireless device 904 to calculate/derive intermediate labels based on its knowledge of TRP locations) or other assistance information (e.g., TRP beam configurations). In response to receiving the indication of the capability of the network entity 908, the wireless device 904 may transmit a set of attributes of a requested DL positioning signal configuration to the network entity 908. The set of attributes of the requested DL positioning signal configuration may include a periodicity of the label assistance reporting and/or whether the network entity 908 should report enhanced timing or resource indications used as labeling assistance information. The network entity 908 may transmit labels and/or assistance information to the wireless device 904 for training a positioning model. The network entity 908 may transmit such data periodically in accordance to the request from the wireless device 904. The network entity 908 may transmit any suitable assistance information that may be used to train the positioning model, such as TRP beam information or enhanced timing and indication of resources used to generate labels. In some aspects, the wireless device 904 may transmit measurements and/or its location (e.g., obtained using non-RAT methods) to the network entity 908 for the network entity 908 to use to calculate intermediate measurement labels, which may be transmitted to the wireless device 904 for training a positioning model.

In some aspects, the network entity 908 may initiate the training collection. For example, the network entity 908 may transmit a request to the wireless device 904 to provide its capability to be involved in a training data collection session and to provide labeling assistance and/or other device-side related assistance information (e.g., CIR, CFR, PDP. ToA, RSTD, RSRP, RSRPP, AoD). The request message may include an indication for a request for the type of training data that the wireless device 904 may provide (e.g., CIR, CFR, PDP, ToA, RSTD, RSRP, RSRPP, AoD). In response to the request message, the wireless device 904 may transmit an indication of its capability to assist the network entity 908 in collecting training data and/or in providing labeling assistance (e.g., using non-RAT methods or RAT methods to calculate a location of the wireless device 904). In response to receiving the indication of the capability of the wireless device 904, the network entity 908 may transmit assistance data to the wireless device 904 to assist in data collection (e.g., as part of LPPa assistance data exchange). The assistance data may include PRS configuration information, types of measurements for the wireless device 904 to report, periodicity for the wireless device 904 to report measurements and/or assistance data, and/or whether the wireless device 904 should report enhanced timing or resource indications. The wireless device 904 may receive positioning signals, such as the set of positioning signals 916 and the set of positioning signals 918, collect measurements of the positioning signals, and feedback any measurements, report, labels, and/or assistance data to the network entity 908 for training a positioning model.

In some aspects, the network entity 908 may configure a positioning signal (e.g., a PRS or an SRS) with a given frequency/time structure (e.g., a given comb/symbol structure such as those disclosed in FIG. 5A-5E, 6A-6C, 7A-7F, or 8A-8C). A training data collection entity, such as the wireless device 902, wireless device 904, or wireless device 906, may consider different subsets of pilots in the positioning signal pattern when estimating the channel between the transmitting wireless device and the receiving wireless device. For each subset of pilots, the data collection entity may estimate the channel and report the corresponding measurements to a training entity or a data repository for training a positioning model. The network entity 908 may configure (e.g., via an LPP or an NRPP message) the subset of pilots to be considered by the data collection entity for channel estimation. For example, the wireless device 904 may be a UE or a PRU that receives a configuration from the network entity 908 as part of LPPa protocol (e.g., assistance data exchange procedure) or another standardized procedure for enabling the wireless device 904 to collect training data for training a positioning model. In another example, the wireless device 902 may be an NG-RAN node that receives a configuration from the network entity 908 as part of NRPPa protocol (e.g., measurement information transfer procedure) or another standardized procedure for enabling the wireless device 902 to collect training data for training a positioning model. In some aspects, the data collection entity may indicate its capability to the network entity about collecting different realizations/instances for non-ideal channel estimations using a subset of pilots. For example, the wireless device 904 may indicate its capability to the network entity 908 as part of a capability exchange procedure in LPPa protocol. In another example, the wireless device 902 may indicate its capability to the network entity 908 as part of a TRP information exchange procedure in NRPPa protocol. Such a capability message may indicate a number of instances that the device may support. Such a capability message may indicate one or more sparse patterns for masking the received positioning signal that may be supported. Such a capability message may any measurement gap conditions that may be associated with enabling the data collection entity to compute multiple channel estimations. The number of instances of channel estimations may be configured by the network entity 908. The number of instances of channel estimations may depend on an expected SNR setting at the data collection entity. For example, the network entity 908 may indicate a map of a number of instances for different SNR ranges, where a 10 dB SNR may be associated with at least 5 instances for the number of channel instances (e.g., pick every other fifth pilot and consider 5 offsets) and a 20 dB SNR may be associated with at least 2 instances for the number of channel estimation instances (e.g., pick every other pilot and consider two offsets).

In some aspects, a training data collection entity, such as the wireless device 902, wireless device 904, or wireless device 906, may consider different subsets of artificial noise when estimating the channel between the transmitting wireless device and the receiving wireless device. For each subset of artificial noise, the data collection entity may estimate the channel and report the corresponding measurements to a training entity or a data repository for training a positioning model. For example, the data collection entity may consider multiple realizations/instances of added noise and may report multiple instances of measurements to a training entity. The network entity 908 may configure (e.g., via an LPP or an NRPP message) the statistics and distribution of the added noise. For example, the wireless device 904 may be a UE or a PRU that receives a configuration from the network entity 908 as part of LPPa protocol (e.g., assistance data exchange procedure) or another standardized procedure for enabling the wireless device 904 to collect training data for training a positioning model. In another example, the wireless device 902 may be an NG-RAN node that receives a configuration from the network entity 908 as part of NRPPa protocol (e.g., measurement information transfer procedure) or another standardized procedure for enabling the wireless device 902 to collect training data for training a positioning model. In some aspects, the data collection entity may indicate its capability to the network entity about collecting different realizations/instances for non-ideal channel estimations using artificially added noise. For example, the wireless device 904 may indicate its capability to the network entity 908 as part of a capability exchange procedure in LPPa protocol. In another example, the wireless device 902 may indicate its capability to the network entity 908 as part of a TRP information exchange procedure in NRPPa protocol. Such a capability message may indicate a number of instances that the device may support. Such a capability message may indicate one or more noise distributions that may be added to the received positioning signal that may be supported. Such a capability message may any measurement gap conditions that may be associated with enabling the data collection entity to compute multiple channel estimations with different noise statistics. The number of instances of added noise and/or the noise settings may be configured by the network entity 908. The number of instances of added noise, and/or the noise settings may depend on an expected SNR setting at the data collection entity. For example, the network entity 908 may indicate a map of a noise attributes for different SNR ranges, where an SNR less than or equal to a first threshold value may be associated with a number of instances being greater than or equal to a second threshold value and/or a noise variance being greater than or equal to a third threshold value, and an SNR greater than or equal to the first threshold value may be associated with a number of instances being less than or equal to the second threshold value and/or a noise variance being less than or equal to the third threshold value.

In some aspects, a network entity may configure a data collection entity to jointly add artificial noise and consider a sparse pattern mask when estimating a channel between a target wireless device and a network node. In some aspects, the training entity that receives the reported measurement instances for a given target location may train the positioning model. The training entity may loop over other target locations considered for training to build a robust positioning model, or may design different positioning models for different attributes of a positioning scenario.

Figure 10:
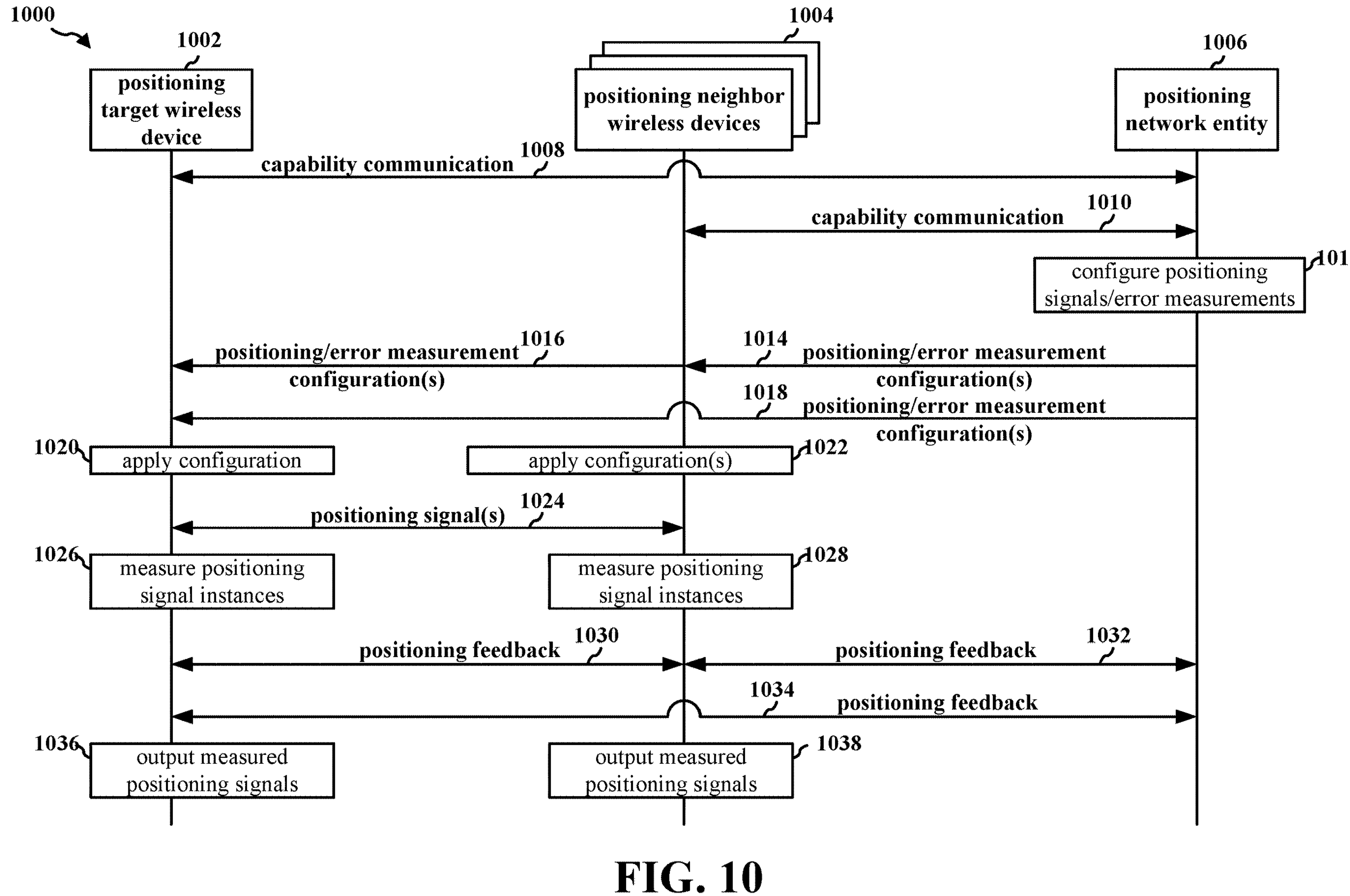
FIG. 10 is a connection flow diagram illustrating an example of communications between a positioning target wireless device, a set of positioning neighbor wireless devices, and a positioning network entity configured to train a positioning model.

FIG. 10 is a connection flow diagram 1000 illustrating an example of communications between a positioning target wireless device 1002, a set of positioning neighbor wireless devices 1004, and a positioning network entity 1006. A wireless device may be configured to collect training data used to train a positioning model. For example, the positioning target wireless device 1002 may collect training data used to train a positioning model. One of the set of positioning neighbor wireless devices 1004 may be used to train a positioning model. The positioning model may be configured to calculate a position of the positioning target wireless device 1002 and/or a set of measurements that may be used to calculate the position of the positioning target wireless device 1002. The positioning target wireless device 1002 may be a UE or a PRU. The PRU may have a set of sensors that may be used to calculate the location of the PRU with a high degree of accuracy, such as a LIDAR sensor, a GNSS device, or a WLAN system configured to calculate a location of the positioning target wireless device 1002 based on received WLAN signals. The PRU may be a fixed PRU with a known location, or may be a mobile PRU that is placed in a known location for the duration of collecting measurements for training the positioning model. The set of positioning neighbor wireless devices 1004 may include a set of base stations and/or a set of TRPs configured to transmit positioning signals at the positioning target wireless device 1002. The positioning network entity 1006 may include an LMF, or may include one or more location servers. The positioning network entity 1006 may be configured to configure positioning occasions between the positioning target wireless device 1002 and the set of positioning neighbor wireless devices 1004. The positioning network entity 1006 may be configured to configure error measurement instances used to collect training data during the positioning occasions between the positioning target wireless device 1002 and the set of positioning neighbor wireless devices 1004.

The positioning target wireless device 1002 may transmit a capability communication 1008 to the positioning network entity 1006. The positioning network entity 1006 may receive the capability communication 1008 from the positioning target wireless device 1002. The positioning network entity 1006 may transmit capability communication 1008 to the positioning target wireless device 1002. The positioning target wireless device 1002 may receive the capability communication 1008 from the positioning network entity 1006. The capability communication 1008 may include an indication of a capability of the positioning target wireless device 1002 to collect different realizations/instances for non-ideal channel estimations. The capability communication 1008 may be part of a capability exchange procedure via an LPP message. The capability communication 1008 may be transmitted using an LPPa protocol. The capability communication 1008 may indicate a number of instances that the positioning target wireless device 1002 may support. The capability communication 1008 may indicate a noise distribution that the positioning target wireless device 1002 may add. The capability communication 1008 may indicate a set of sparse patterns that the positioning target wireless device 1002 may use to measure a positioning signal (e.g., PRS, CSI-RS). The capability communication 1008 may indicate a set of measurement gap conditions for the positioning target wireless device 1002 to compute the multiple channel estimations with different noise and/or sparse patterns. In some aspects, the positioning network entity 1006 may configure, via the capability communication 1008 or a set of configurations 1018, a number of instances of channel estimations that the positioning target wireless device 1002 uses based on a signal-to-noise (SNR) setting at the positioning target wireless device 1002. For example, the positioning network entity 1006 may indicate a map of a number of realizations/instances for different SNR ranges. Each SNR range may correspond with a number of instances for the positioning target wireless device 1002 to measure. For example, for an SNR of 10 dB, the map may indicate to the positioning target wireless device 1002 to use at least 5 instances (e.g., pick every other $5^{th}$ pilot and consider 5 offsets). In contrast, for an SNR of 20 dB, the map may indicate to the positioning target wireless device 1002 to use at least 2 instances (e.g., pick every other pilot and consider 2 offsets). In another example, for an SNR that is estimated or expected to be at or below a first threshold amount, the map may indicate to the positioning target wireless device 1002 to use a number of realizations at or above a second threshold amount, and/or to use a noise variance that is at or above a third threshold amount. For an SNR that is estimated or expected to be at or above the first threshold amount, the map may indicate to the positioning target wireless device 1002 to use a number of realizations at or below the second threshold amount, and/or to use a noise variance that is at or below the third threshold amount.

At least one of the set of positioning neighbor wireless devices 1004 may transmit a capability communication 1010 to the positioning network entity 1006. The positioning network entity 1006 may receive the capability communication 1010 from the at least one of the set of positioning neighbor wireless devices 1004. The positioning network entity 1006 may transmit capability communication 1010 to the at least one of the set of positioning neighbor wireless devices 1004. The at least one of the set of positioning neighbor wireless devices 1004 may receive the capability communication 1010 from the positioning network entity 1006. The capability communication 1010 may include an indication of a capability of the at least one of the set of positioning neighbor wireless devices 1004 to collect different realizations/instances for non-ideal channel estimations. The capability communication 1010 may be part of a TRP information exchange procedure via an NRPP message. The capability communication 1010 may be transmitted using an NRPPa protocol. The capability communication 1010 may indicate a number of instances that the at least one of the set of positioning neighbor wireless devices 1004 may support. The capability communication 1010 may indicate a noise distribution that the at least one of the set of positioning neighbor wireless devices 1004 may add. The capability communication 1010 may indicate a set of sparse patterns that the at least one of the set of positioning neighbor wireless devices 1004 may use to measure a positioning signal (e.g., SRS, CSI-RS). The capability communication 1010 may indicate a set of measurement gap conditions for the at least one of the set of positioning neighbor wireless devices 1004 to compute the multiple channel estimations with different noise and/or sparse patterns. In some aspects, the positioning network entity 1006 may configure, via the capability communication 1010 or a set of configurations 1014, a number of instances of channel estimations that the at least one of the set of positioning neighbor wireless devices 1004 uses based on a signal-to-noise (SNR) setting at the at least one of the set of positioning neighbor wireless devices 1004.

At 1012, the positioning network entity 1006 may configure positioning signals for transmission between the positioning target wireless device 1002 and the set of positioning neighbor wireless devices 1004. In other words, the positioning network entity 1006 may configure a set of positioning occasions. At 1012, the positioning network entity 1006 may configure error measurements for measuring the set of positioning signals 1024 by the positioning target wireless device 1002 and/or the set of positioning neighbor wireless devices 1004. In other words, the positioning network entity 1006 may configure a set of channel estimation error instances/realizations for a training data collection device to generate based on the set of positioning signals 1024 it receives.

The positioning network entity 1006 may transmit the set of configurations 1014 to the set of positioning neighbor wireless devices 1004. The set of positioning neighbor wireless devices 1004 may receive the set of configurations 1014 from the positioning network entity 1006. At least one of the set of positioning neighbor wireless devices 1004 may transmit at least some of the set of configurations 1016 to the positioning target wireless device 1002 based on the set of configurations 1014. For example, a network node serving the positioning target wireless device 1002 may transmit the set of configurations 1016 for configuring transmission of at least some of the set of positioning signals 1024 or measuring at least some of the set of positioning signals 1024. In some aspects, the positioning network entity 1006 may directly configure the positioning target wireless device 1002 by transmitting the set of configurations 1018 to the positioning target wireless device 1002. The positioning target wireless device 1002 may receive the set of configurations 1018.

At 1020, the positioning target wireless device 1002 may apply the set of configurations 1018 and/or the set of configurations 1016. At 1022, the set of positioning neighbor wireless devices 1004 may apply the set of configurations 1014. The set of configurations may configure a wireless device to transmit the set of positioning signals 1024. The set of configurations may configure a wireless device to measure the set of positioning signals 1024 based on a plurality of sparse pilot masks and/or a plurality of artificial noise signals.

The positioning target wireless device 1002 may transmit a set of positioning signals 1024 at the set of positioning neighbor wireless devices 1004 based on at least some of the set of configurations 1018 and/or the set of configurations 1016. The set of positioning signals 1024 may include a set of SRSs, a set of CSI-RSs, or a set of SSBs. At 1028, the set of positioning neighbor wireless devices 1004 may measure the set of positioning signals 1024 based on the set of configurations 1014. The set of configurations 1014 may indicate at least some of the estimated error measurements made by the set of positioning neighbor wireless devices 1004 when measuring the set of positioning signals 1024, for example identifiers of sparse pilot masks to apply to measurements and/or identifiers of artificial noise signals to add to the measurements. At least one of the set of positioning neighbor wireless devices 1004 may receive positioning feedback 1030 from the positioning target wireless device 1002 and/or positioning feedback 1032 from the positioning network entity 1006. The positioning feedback may include assistance information or calculated labels, such as a calculated position of the positioning target wireless device 1002. At 1038, at least one of the set of positioning neighbor wireless devices 1004 may output the measured positioning signals to a positioning model. For example, the at least one of the set of positioning neighbor wireless devices 1004 may train a positioning model at the at least one of the set of positioning neighbor wireless devices 1004 based on the measured positioning signals with channel error estimations, or the at least one of the set of positioning neighbor wireless devices 1004 may transmit the training data to a training entity, such as the positioning network entity 1006, the positioning target wireless device 1002, or an OTT server.

The set of positioning neighbor wireless devices 1004 may transmit a set of positioning signals 1024 at the positioning target wireless device 1002 based on at least some of the set of configurations 1014. The set of positioning signals 1024 may include a set of PRSs or a set of CSI-RSs. At 1026, the positioning target wireless device 1002 may measure the set of positioning signals 1024 based on at least some of the set of configurations 1018 and/or the set of configurations 1016. The set of configurations 1018 and/or the set of configurations 1016 may indicate at least some of the error measurements made by the positioning target wireless device 1002 when measuring the set of positioning signals 1024, for example identifiers of sparse pilot masks to apply to measurements and/or identifiers of artificial noise signals to add to the measurements. The positioning target wireless device 1002 may receive positioning feedback 1034 from the positioning network entity 1006. The positioning feedback may include assistance information or calculated labels, such as a calculated position of the positioning target wireless device 1002. At 1036, the positioning target wireless device 1002 may output the measured positioning signals to a positioning model. For example, positioning target wireless device 1002 may train a positioning model at the positioning target wireless device 1002 based on the measured positioning signals with channel error estimations, or the positioning target wireless device 1002 may transmit the training data to a training entity, such as the positioning network entity 1006, at least one of the set of positioning neighbor wireless devices 1004, or an OTT server.

FIG. 11 is a flowchart 1100 of a method of wireless communication. The method may be performed by a wireless device (e.g., the UE 104, the UE 350; the base station 102, the base station 310; the wireless device 402, the wireless device 404, the wireless device 406, the wireless device 902, the wireless device 904, the wireless device 906; the positioning target wireless device 1002; one of the set of positioning neighbor wireless devices 1004; the apparatus 1804; the network entity 1802, the network entity 1902). At 1102, the wireless device may receive a set of positioning signals. For example, 1102 may be performed by the positioning target wireless device 1002 in FIG. 10, which may receive a set of positioning signals 1024 from the set of positioning neighbor wireless devices 1004. The set of positioning signals 1024 may include a set of PRSs, a set of CSI-RSs, or a set of SSBs. In another example, 1102 may be performed by one of the set of positioning neighbor wireless devices 1004 in FIG. 10, which may receive a set of positioning signals 1024 from the positioning target wireless device 1002. The set of positioning signals 1024 may include a set of SRSs, a set of CSI-RSs, or a set of SSBs. Moreover, 1102 may be performed by the component 198 in FIG. 18 or 19.

At 1104, the wireless device may measure the set of positioning signals based on at least one of a plurality of sparse pilot masks or a plurality of artificial noise signals. For example, 1104 may be performed by the positioning target wireless device 1002 in FIG. 10, which may, at 1026, measure the set of positioning signals 1024 based on at least one of a plurality of sparse pilot masks or a plurality of artificial noise signals indicated in the set of configurations 1016 or the set of configurations 1018. In another example, 1104 may be performed by one of the set of positioning neighbor wireless devices 1004 in FIG. 10, which may, at 1028, measure the set of positioning signals 1024 based on at least one of a plurality of sparse pilot masks or a plurality of artificial noise signals indicated in the set of configurations 1014. Moreover, 1104 may be performed by the component 198 in FIG. 18 or 19.

At 1106, the wireless device may output the measured set of positioning signals for training a positioning model. For example, 1106 may be performed by the positioning target wireless device 1002 in FIG. 10, which may, at 1036, output the measured set of positioning signals, measured at 1026, for training a positioning model. In another example, 1106 may be performed by one of the set of positioning neighbor wireless devices 1004 in FIG. 10, which may, at 1038, output the measured set of positioning signals, measured at 1026, for training a positioning model. Moreover, 1106 may be performed by the component 198 in FIG. 18 or 19.

FIG. 12 is a flowchart 1200 of a method of wireless communication. The method may be performed by a wireless device (e.g., the UE 104, the UE 350; the base station 102, the base station 310; the wireless device 402, the wireless device 404, the wireless device 406, the wireless device 902, the wireless device 904, the wireless device 906;

the positioning target wireless device 1002; one of the set of positioning neighbor wireless devices 1004; the apparatus 1804; the network entity 1802, the network entity 1902). At 1202, the wireless device may receive a set of positioning signals. For example, 1202 may be performed by the positioning target wireless device 1002 in FIG. 10, which may receive a set of positioning signals 1024 from the set of positioning neighbor wireless devices 1004. The set of positioning signals 1024 may include a set of PRSs, a set of CSI-RSs, or a set of SSBs. In another example, 1202 may be performed by one of the set of positioning neighbor wireless devices 1004 in FIG. 10, which may receive a set of positioning signals 1024 from the positioning target wireless device 1002. The set of positioning signals 1024 may include a set of SRSs, a set of CSI-RSs, or a set of SSBs. Moreover, 1202 may be performed by the component 198 in FIG. 18 or 19.

At 1204, the wireless device may measure the set of positioning signals based on at least one of a plurality of sparse pilot masks or a plurality of artificial noise signals. For example, 1204 may be performed by the positioning target wireless device 1002 in FIG. 10, which may, at 1026, measure the set of positioning signals 1024 based on at least one of a plurality of sparse pilot masks or a plurality of artificial noise signals indicated in the set of configurations 1016 or the set of configurations 1018. In another example, 1204 may be performed by one of the set of positioning neighbor wireless devices 1004 in FIG. 10, which may, at 1028, measure the set of positioning signals 1024 based on at least one of a plurality of sparse pilot masks or a plurality of artificial noise signals indicated in the set of configurations 1014. Moreover, 1204 may be performed by the component 198 in FIG. 18 or 19.

At 1206, the wireless device may output the measured set of positioning signals for training a positioning model. For example, 1206 may be performed by the positioning target wireless device 1002 in FIG. 10, which may, at 1036, output the measured set of positioning signals, measured at 1026, for training a positioning model. In another example, 1206 may be performed by one of the set of positioning neighbor wireless devices 1004 in FIG. 10, which may, at 1038, output the measured set of positioning signals, measured at 1026, for training a positioning model. Moreover, 1206 may be performed by the component 198 in FIG. 18 or 19.

At 1208, the wireless device may simulate a first set of impaired positioning signals by masking the set of positioning signals based on a first sparse pilot mask of the plurality of sparse pilot masks. For example, 1208 may be performed by the positioning target wireless device 1002 in FIG. 10, which may simulate a first set of impaired positioning signals by masking the set of positioning signals based on a first sparse pilot mask of the plurality of sparse pilot masks. In another example, 1208 may be performed by one of the set of positioning neighbor wireless devices 1004 in FIG. 10, which may simulate a first set of impaired positioning signals by masking the set of positioning signals based on a first sparse pilot mask of the plurality of sparse pilot masks. Moreover, 1208 may be performed by the component 198 in FIG. 18 or 19.

At 1210, the wireless device may measure the first set of impaired positioning signals. For example, 1210 may be performed by the positioning target wireless device 1002 in FIG. 10, which may measure the first set of impaired positioning signals. In another example, 1210 may be performed by one of the set of positioning neighbor wireless devices 1004 in FIG. 10, which may measure the first set of impaired positioning signals. Moreover, 1210 may be performed by the component 198 in FIG. 18 or 19.

At 1212, the wireless device may simulate a second set of impaired positioning signals by masking the set of positioning signals based on a second sparse pilot mask of the plurality of sparse pilot masks. For example, 1212 may be performed by the positioning target wireless device 1002 in FIG. 10, which may simulate a second set of impaired positioning signals by masking the set of positioning signals based on a second sparse pilot mask of the plurality of sparse pilot masks. In another example, 1212 may be performed by one of the set of positioning neighbor wireless devices 1004 in FIG. 10, which may simulate a second set of impaired positioning signals by masking the set of positioning signals based on a second sparse pilot mask of the plurality of sparse pilot masks. Moreover, 1212 may be performed by the component 198 in FIG. 18 or 19.

At 1214, the wireless device may measure the second set of impaired positioning signals. For example, 1214 may be performed by the positioning target wireless device 1002 in FIG. 10, which may measure the second set of impaired positioning signals. In another example, 1214 may be performed by one of the set of positioning neighbor wireless devices 1004 in FIG. 10, which may measure the second set of impaired positioning signals. Moreover, 1214 may be performed by the component 198 in FIG. 18 or 19.

At 1216, the wireless device may simulate a first set of impaired positioning signals by combining the set of positioning signals with a first artificial noise signal of the plurality of artificial noise signals. For example, 1216 may be performed by the positioning target wireless device 1002 in FIG. 10, which may simulate a first set of impaired positioning signals by combining the set of positioning signals with a first artificial noise signal of the plurality of artificial noise signals. In another example, 1216 may be performed by one of the set of positioning neighbor wireless devices 1004 in FIG. 10, which may simulate a first set of impaired positioning signals by combining the set of positioning signals with a first artificial noise signal of the plurality of artificial noise signals. Moreover, 1216 may be performed by the component 198 in FIG. 18 or 19.

At 1218, the wireless device may measure the first set of impaired positioning signals. For example, 1218 may be performed by the positioning target wireless device 1002 in FIG. 10, which may measure the first set of impaired positioning signals. In another example, 1218 may be performed by one of the set of positioning neighbor wireless devices 1004 in FIG. 10, which may measure the first set of impaired positioning signals. Moreover, 1218 may be performed by the component 198 in FIG. 18 or 19.

At 1220, the wireless device may simulate a second set of impaired positioning signals by combining the set of positioning signals with a second artificial noise signal of the plurality of artificial noise signals. For example, 1220 may be performed by the positioning target wireless device 1002 in FIG. 10, which may simulate a second set of impaired positioning signals by combining the set of positioning signals with a second artificial noise signal of the plurality of artificial noise signals. In another example, 1220 may be performed by one of the set of positioning neighbor wireless devices 1004 in FIG. 10, which may simulate a second set of impaired positioning signals by combining the set of positioning signals with a second artificial noise signal of the plurality of artificial noise signals. Moreover, 1220 may be performed by the component 198 in FIG. 18 or 19.

At 1222, the wireless device may measure the second set of impaired positioning signals. For example, 1222 may be performed by the positioning target wireless device 1002 in FIG. 10, which may measure the second set of impaired positioning signals. In another example, 1222 may be performed by one of the set of positioning neighbor wireless devices 1004 in FIG. 10, which may measure the second set of impaired positioning signals. Moreover, 1222 may be performed by the component 198 in FIG. 18 or 19.

At 1224, the wireless device may train the positioning model at the wireless device based on the measured set of positioning signals. For example, 1224 may be performed by the positioning target wireless device 1002 in FIG. 10, which may train the positioning model at the wireless device based on the measured set of positioning signals. In another example, 1224 may be performed by one of the set of positioning neighbor wireless devices 1004 in FIG. 10, which may train the positioning model at the wireless device based on the measured set of positioning signals. Moreover, 1224 may be performed by the component 198 in FIG. 18 or 19.

At 1226, the wireless device may transmit, to a training entity, the measured set of positioning signals for training the positioning model. For example, 1226 may be performed by the positioning target wireless device 1002 in FIG. 10, which may transmit, to a training entity, the measured set of positioning signals for training the positioning model. In another example, 1226 may be performed by one of the set of positioning neighbor wireless devices 1004 in FIG. 10, which may transmit, to a training entity, the measured set of positioning signals for training the positioning model. Moreover, 1226 may be performed by the component 198 in FIG. 18 or 19.

Figure 13:
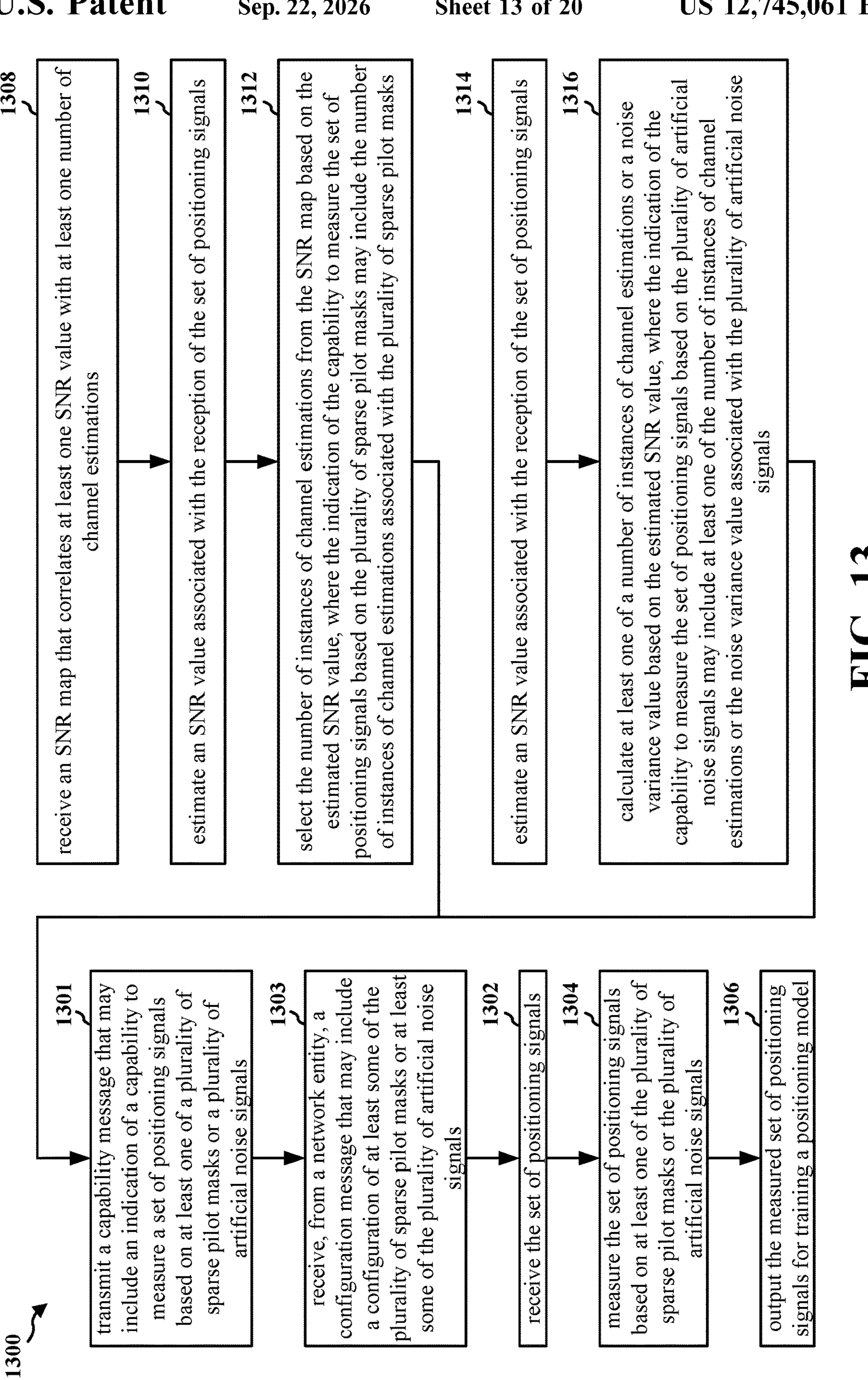
FIG. 13 is a flowchart of a method of wireless communication.

FIG. 13 is a flowchart 1300 of a method of wireless communication. The method may be performed by a wireless device (e.g., the UE 104, the UE 350; the base station 102, the base station 310; the wireless device 402, the wireless device 404, the wireless device 406, the wireless device 902, the wireless device 904, the wireless device 906; the positioning target wireless device 1002; one of the set of positioning neighbor wireless devices 1004; the apparatus 1804; the network entity 1802, the network entity 1902). At 1301, the wireless device may transmit a capability message that may include an indication of a capability to measure a set of positioning signals based on at least one of a plurality of sparse pilot masks or a plurality of artificial noise signals. For example, 1301 may be performed by the positioning target wireless device 1002 in FIG. 10, which may transmit a capability message that may include an indication of a capability to measure a set of positioning signals based on at least one of a plurality of sparse pilot masks or a plurality of artificial noise signals. In another example, 1301 may be performed by one of the set of positioning neighbor wireless devices 1004 in FIG. 10, which may transmit a capability message that may include an indication of a capability to measure a set of positioning signals based on at least one of a plurality of sparse pilot masks or a plurality of artificial noise signals. Moreover, 1301 may be performed by the component 198 in FIG. 18 or 19.

At 1303, the wireless device may receive, from a network entity, a configuration message that may include a configuration of at least some of the plurality of sparse pilot masks or at least some of the plurality of artificial noise signals. For example, 1303 may be performed by the positioning target wireless device 1002 in FIG. 10, which may receive, from a network entity, a configuration message that may include a configuration of at least some of the plurality of sparse pilot masks or at least some of the plurality of artificial noise signals. In another example, 1303 may be performed by one of the set of positioning neighbor wireless devices 1004 in FIG. 10, which may receive, from a network entity, a configuration message that may include a configuration of at least some of the plurality of sparse pilot masks or at least some of the plurality of artificial noise signals. Moreover, 1303 may be performed by the component 198 in FIG. 18 or 19.

At 1302, the wireless device may receive the set of positioning signals. For example, 1302 may be performed by the positioning target wireless device 1002 in FIG. 10, which may receive a set of positioning signals 1024 from the set of positioning neighbor wireless devices 1004. The set of positioning signals 1024 may include a set of PRSs, a set of CSI-RSs, or a set of SSBs. In another example, 1302 may be performed by one of the set of positioning neighbor wireless devices 1004 in FIG. 10, which may receive a set of positioning signals 1024 from the positioning target wireless device 1002. The set of positioning signals 1024 may include a set of SRSs, a set of CSI-RSs, or a set of SSBs. Moreover, 1302 may be performed by the component 198 in FIG. 18 or 19.

At 1304, the wireless device may measure the set of positioning signals based on at least one of the plurality of sparse pilot masks or the plurality of artificial noise signals. For example, 1304 may be performed by the positioning target wireless device 1002 in FIG. 10, which may, at 1026, measure the set of positioning signals 1024 based on at least one of a plurality of sparse pilot masks or a plurality of artificial noise signals indicated in the set of configurations 1016 or the set of configurations 1018. In another example, 1304 may be performed by one of the set of positioning neighbor wireless devices 1004 in FIG. 10, which may, at 1028, measure the set of positioning signals 1024 based on at least one of a plurality of sparse pilot masks or a plurality of artificial noise signals indicated in the set of configurations 1014. Moreover, 1304 may be performed by the component 198 in FIG. 18 or 19.

At 1306, the wireless device may output the measured set of positioning signals for training a positioning model. For example, 1306 may be performed by the positioning target wireless device 1002 in FIG. 10, which may, at 1036, output the measured set of positioning signals, measured at 1026, for training a positioning model. In another example, 1306 may be performed by one of the set of positioning neighbor wireless devices 1004 in FIG. 10, which may, at 1038, output the measured set of positioning signals, measured at 1026, for training a positioning model. Moreover, 1306 may be performed by the component 198 in FIG. 18 or 19.

At 1308, the wireless device may receive an SNR map that correlates at least one SNR value with at least one number of channel estimations. For example, 1308 may be performed by the positioning target wireless device 1002 in FIG. 10, which may receive an SNR map that correlates at least one SNR value with at least one number of channel estimations. In another example, 1308 may be performed by one of the set of positioning neighbor wireless devices 1004 in FIG. 10, which may receive an SNR map that correlates at least one SNR value with at least one number of channel estimations. Moreover, 1308 may be performed by the component 198 in FIG. 18 or 19.

At 1310, the wireless device may estimate an SNR value associated with the reception of the set of positioning signals. For example, 1310 may be performed by the positioning target wireless device 1002 in FIG. 10, which may estimate an SNR value associated with the reception of the set of positioning signals. In another example, 1310 may be performed by one of the set of positioning neighbor wireless devices 1004 in FIG. 10, which may estimate an SNR value associated with the reception of the set of positioning signals. Moreover, 1310 may be performed by the component 198 in FIG. 18 or 19.

At 1312, the wireless device may select the number of instances of channel estimations from the SNR map based on the estimated SNR value, where the indication of the capability to measure the set of positioning signals based on the plurality of sparse pilot masks may include the number of instances of channel estimations associated with the plurality of sparse pilot masks. For example, 1312 may be performed by the positioning target wireless device 1002 in FIG. 10, which may select the number of instances of channel estimations from the SNR map based on the estimated SNR value, where the indication of the capability to measure the set of positioning signals based on the plurality of sparse pilot masks may include the number of instances of channel estimations associated with the plurality of sparse pilot masks. In another example, 1312 may be performed by one of the set of positioning neighbor wireless devices 1004 in FIG. 10, which may select the number of instances of channel estimations from the SNR map based on the estimated SNR value, where the indication of the capability to measure the set of positioning signals based on the plurality of sparse pilot masks may include the number of instances of channel estimations associated with the plurality of sparse pilot masks. Moreover, 1312 may be performed by the component 198 in FIG. 18 or 19.

At 1314, the wireless device may estimate an SNR value associated with the reception of the set of positioning signals. For example, 1314 may be performed by the positioning target wireless device 1002 in FIG. 10, which may estimate an SNR value associated with the reception of the set of positioning signals. In another example, 1314 may be performed by one of the set of positioning neighbor wireless devices 1004 in FIG. 10, which may estimate an SNR value associated with the reception of the set of positioning signals. Moreover, 1314 may be performed by the component 198 in FIG. 18 or 19.

At 1316, the wireless device may calculate at least one of a number of instances of channel estimations or a noise variance value based on the estimated SNR value, where the indication of the capability to measure the set of positioning signals based on the plurality of artificial noise signals may include at least one of the number of instances of channel estimations or the noise variance value associated with the plurality of artificial noise signals. For example, 1316 may be performed by the positioning target wireless device 1002 in FIG. 10, which may calculate at least one of a number of instances of channel estimations or a noise variance value based on the estimated SNR value, where the indication of the capability to measure the set of positioning signals based on the plurality of artificial noise signals may include at least one of the number of instances of channel estimations or the noise variance value associated with the plurality of artificial noise signals. In another example, 1316 may be performed by one of the set of positioning neighbor wireless devices 1004 in FIG. 10, which may calculate at least one of a number of instances of channel estimations or a noise variance value based on the estimated SNR value, where the indication of the capability to measure the set of positioning signals based on the plurality of artificial noise signals may include at least one of the number of instances of channel estimations or the noise variance value associated with the plurality of artificial noise signals. Moreover, 1316 may be performed by the component 198 in FIG. 18 or 19.

FIG. 14 is a flowchart 1400 of a method of wireless communication. The method may be performed by a network entity (e.g., the base station 102, the base station 310; the wireless device 402, the wireless device 406, the network entity 908; the positioning network entity 1006; the network entity 1802, the network entity 1002, the network entity 1160). At 1402, the network entity may transmit a first configuration for receiving a set of positioning signals. For example, 1402 may be performed by the positioning network entity 1006 in FIG. 10, which may transmit a first configuration for receiving the set of positioning signals 1024 as the set of configurations 1014 to the set of positioning neighbor wireless devices 1004 or as the set of configurations 1018 to the positioning target wireless device 1002. Moreover, 1402 may be performed by the component 199 in FIG. 19 or 20.

At 1404, the network entity may transmit a second configuration for measuring the set of positioning signals for training a positioning model, where the second configuration may include a configuration to measure the set of positioning signals based on at least one of a plurality of sparse pilot masks or a plurality of artificial noise signals. For example, 1404 may be performed by the positioning network entity 1006 in FIG. 10, which may transmit a second configuration for measuring the set of positioning signals 1024 for training a positioning model as the set of configurations 1014 to the set of positioning neighbor wireless devices 1004 or as the set of configurations 1018 to the positioning target wireless device 1002. The second configuration may include a configuration to measure the set of positioning signals 1024 based on at least one of a plurality of sparse pilot masks or a plurality of artificial noise signals. Moreover, 1404 may be performed by the component 199 in FIG. 19 or 20.

Figure 15:
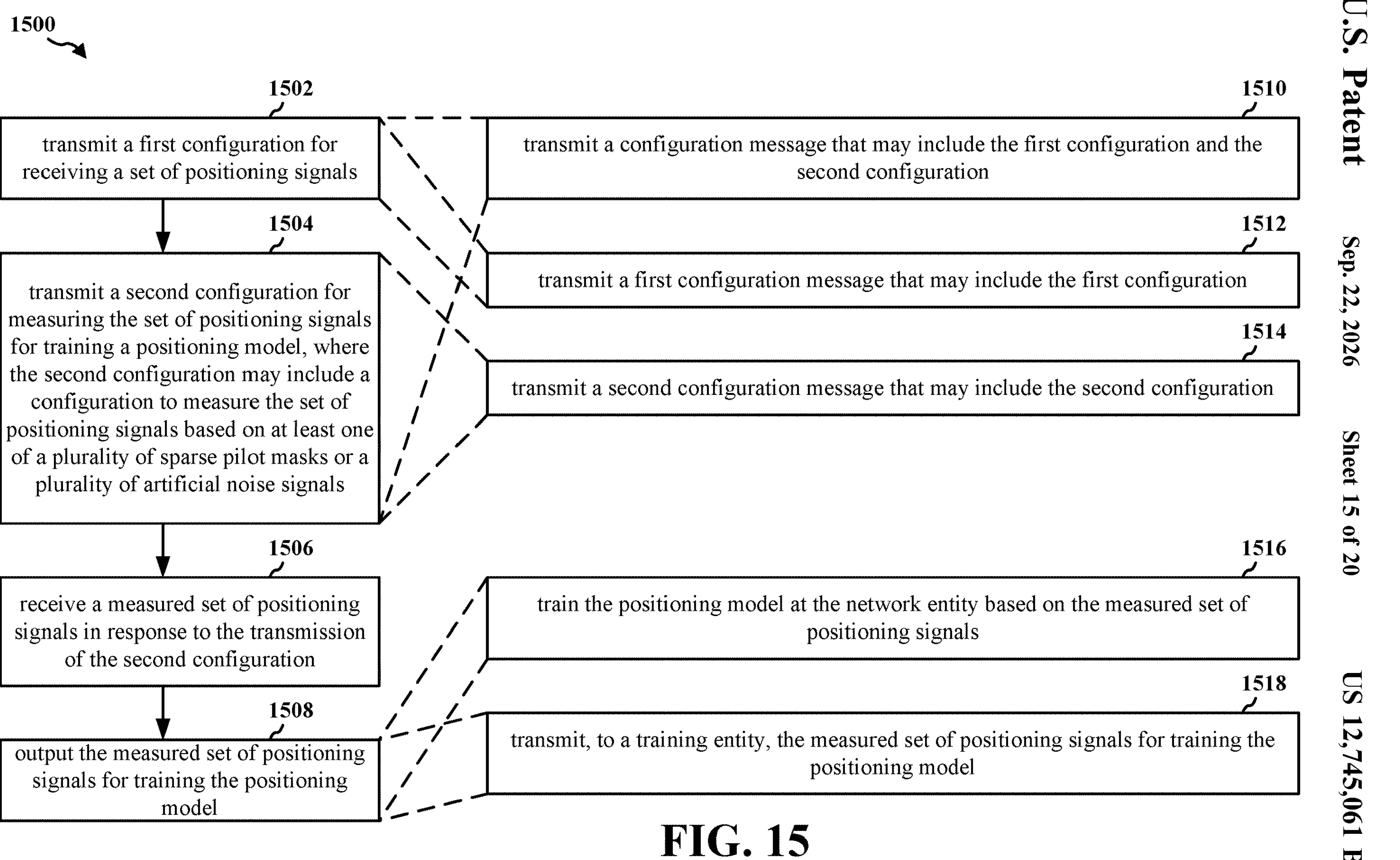
FIG. 15 is a flowchart of a method of wireless communication.

FIG. 15 is a flowchart 1500 of a method of wireless communication. The method may be performed by a network entity (e.g., the base station 102, the base station 310; the wireless device 402, the wireless device 406, the network entity 908; the positioning network entity 1006; the network entity 1802, the network entity 1002, the network entity 1160). At 1502, the network entity may transmit a first configuration for receiving a set of positioning signals. For example, 1502 may be performed by the positioning network entity 1006 in FIG. 10, which may transmit a first configuration for receiving the set of positioning signals 1024 as the set of configurations 1014 to the set of positioning neighbor wireless devices 1004 or as the set of configurations 1018 to the positioning target wireless device 1002. Moreover, 1502 may be performed by the component 199 in FIG. 19 or 20.

At 1504, the network entity may transmit a second configuration for measuring the set of positioning signals for training a positioning model, where the second configuration may include a configuration to measure the set of positioning signals based on at least one of a plurality of sparse pilot masks or a plurality of artificial noise signals. For example, 1504 may be performed by the positioning network entity 1006 in FIG. 10, which may transmit a second configuration for measuring the set of positioning signals 1024 for training a positioning model as the set of configurations 1014 to the set of positioning neighbor wireless devices 1004 or as the set of configurations 1018 to the positioning target wireless device 1002. The second configuration may include a configuration to measure the set of positioning signals 1024 based on at least one of a plurality of sparse pilot masks or a plurality of artificial noise signals. Moreover, 1504 may be performed by the component 199 in FIG. 19 or 20.

At 1506, the network entity may receive a measured set of positioning signals in response to the transmission of the second configuration. For example, 1506 may be performed by the positioning network entity 1006 in FIG. 10, which may receive a measured set of positioning signals in response to the transmission of the second configuration. Moreover, 1506 may be performed by the component 199 in FIG. 19 or 20.

At 1508, the network entity may output the measured set of positioning signals for training the positioning model. For example, 1508 may be performed by the positioning network entity 1006 in FIG. 10, which may output the measured set of positioning signals for training the positioning model. Moreover, 1508 may be performed by the component 199 in FIG. 19 or 20.

At 1510, the network entity may transmit a configuration message that may include the first configuration and the second configuration. For example, 1510 may be performed by the positioning network entity 1006 in FIG. 10, which may transmit a configuration message that may include the first configuration and the second configuration. Moreover, 1510 may be performed by the component 199 in FIG. 19 or 20.

At 1512, the network entity may transmit a first configuration message that may include the first configuration. For example, 1512 may be performed by the positioning network entity 1006 in FIG. 10, which may transmit a first configuration message that may include the first configuration. Moreover, 1512 may be performed by the component 199 in FIG. 19 or 20.

At 1514, the network entity may transmit a second configuration message that may include the second configuration. For example, 1514 may be performed by the positioning network entity 1006 in FIG. 10, which may transmit a second configuration message that may include the second configuration. Moreover, 1514 may be performed by the component 199 in FIG. 19 or 20.

At 1516, the network entity may train the positioning model at the network entity based on the measured set of positioning signals. For example, 1516 may be performed by the positioning network entity 1006 in FIG. 10, which may train the positioning model at the network entity based on the measured set of positioning signals. Moreover, 1516 may be performed by the component 199 in FIG. 19 or 20.

At 1518, the network entity may transmit, to a training entity, the measured set of positioning signals for training the positioning model. For example, 1518 may be performed by the positioning network entity 1006 in FIG. 10, which may transmit, to a training entity, the measured set of positioning signals for training the positioning model. Moreover, 1518 may be performed by the component 199 in FIG. 19 or 20.

Figure 16:
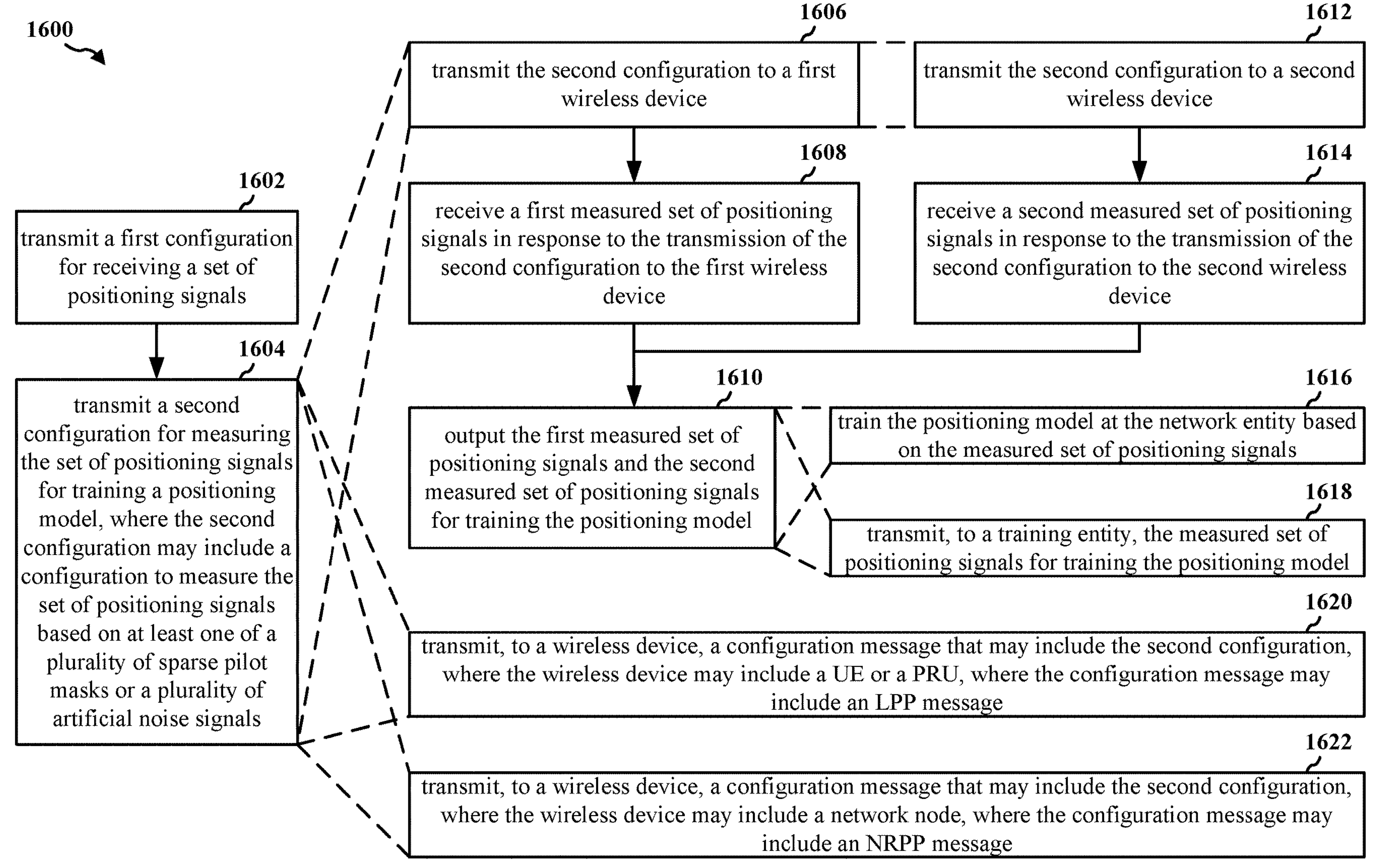
FIG. 16 is a flowchart of a method of wireless communication.

FIG. 16 is a flowchart 1600 of a method of wireless communication. The method may be performed by a network entity (e.g., the base station 102, the base station 310; the wireless device 402, the wireless device 406, the network entity 908; the positioning network entity 1006; the network entity 1802, the network entity 1002, the network entity 1160). At 1602, the network entity may transmit a first configuration for receiving a set of positioning signals. For example, 1602 may be performed by the positioning network entity 1006 in FIG. 10, which may transmit a first configuration for receiving the set of positioning signals 1024 as the set of configurations 1014 to the set of positioning neighbor wireless devices 1004 or as the set of configurations 1018 to the positioning target wireless device 1002. Moreover, 1602 may be performed by the component 199 in FIG. 19 or 20.

At 1604, the network entity may transmit a second configuration for measuring the set of positioning signals for training a positioning model, where the second configuration may include a configuration to measure the set of positioning signals based on at least one of a plurality of sparse pilot masks or a plurality of artificial noise signals. For example, 1604 may be performed by the positioning network entity 1006 in FIG. 10, which may transmit a second configuration for measuring the set of positioning signals 1024 for training a positioning model as the set of configurations 1014 to the set of positioning neighbor wireless devices 1004 or as the set of configurations 1018 to the positioning target wireless device 1002. The second configuration may include a configuration to measure the set of positioning signals 1024 based on at least one of a plurality of sparse pilot masks or a plurality of artificial noise signals. Moreover, 1604 may be performed by the component 199 in FIG. 19 or 20.

At 1606, the network entity may transmit the second configuration to a first wireless device. For example, 1606 may be performed by the positioning network entity 1006 in FIG. 10, which may transmit the second configuration to a first wireless device. Moreover, 1606 may be performed by the component 199 in FIG. 19 or 20.

At 1608, the network entity may receive a first measured set of positioning signals in response to the transmission of the second configuration to the first wireless device. For example, 1608 may be performed by the positioning network entity 1006 in FIG. 10, which may receive a first measured set of positioning signals in response to the transmission of the second configuration to the first wireless device. Moreover, 1608 may be performed by the component 199 in FIG. 19 or 20.

At 1610, the network entity may output the first measured set of positioning signals and the second measured set of positioning signals for training the positioning model. For example, 1610 may be performed by the positioning network entity 1006 in FIG. 10, which may output the first measured set of positioning signals and the second measured set of positioning signals for training the positioning model. Moreover, 1610 may be performed by the component 199 in FIG. 19 or 20.

At 1612, the network entity may transmit the second configuration to a second wireless device. For example, 1612 may be performed by the positioning network entity 1006 in FIG. 10, which may transmit the second configuration to a second wireless device. Moreover, 1612 may be performed by the component 199 in FIG. 19 or 20.

At 1614, the network entity may receive a second measured set of positioning signals in response to the transmission of the second configuration to the second wireless device. For example, 1614 may be performed by the positioning network entity 1006 in FIG. 10, which may receive a second measured set of positioning signals in response to the transmission of the second configuration to the second wireless device. Moreover, 1614 may be performed by the component 199 in FIG. 19 or 20.

At 1616, the network entity may train the positioning model at the network entity based on the measured set of positioning signals. For example, 1616 may be performed by the positioning network entity 1006 in FIG. 10, which may train the positioning model at the network entity based on the measured set of positioning signals. Moreover, 1616 may be performed by the component 199 in FIG. 19 or 20.

At 1618, the network entity may transmit, to a training entity, the measured set of positioning signals for training the positioning model. For example, 1618 may be performed by the positioning network entity 1006 in FIG. 10, which may transmit, to a training entity, the measured set of positioning signals for training the positioning model. Moreover, 1618 may be performed by the component 199 in FIG. 19 or 20.

At 1620, the network entity may transmit, to a wireless device, a configuration message that may include the second configuration, where the wireless device may include a UE or a PRU, where the configuration message may include an LPP message. For example, 1620 may be performed by the positioning network entity 1006 in FIG. 10, which may transmit, to a wireless device, a configuration message that may include the second configuration, where the wireless device may include a UE or a PRU, where the configuration message may include an LPP message. Moreover, 1620 may be performed by the component 199 in FIG. 19 or 20.

At 1622, the network entity may transmit, to a wireless device, a configuration message that may include the second configuration, where the wireless device may include a network node, where the configuration message may include an NRPP message. For example, 1622 may be performed by the positioning network entity 1006 in FIG. 10, which may transmit, to a wireless device, a configuration message that may include the second configuration, where the wireless device may include a network node, where the configuration message may include an NRPP message. Moreover, 1622 may be performed by the component 199 in FIG. 19 or 20.

Figure 17:
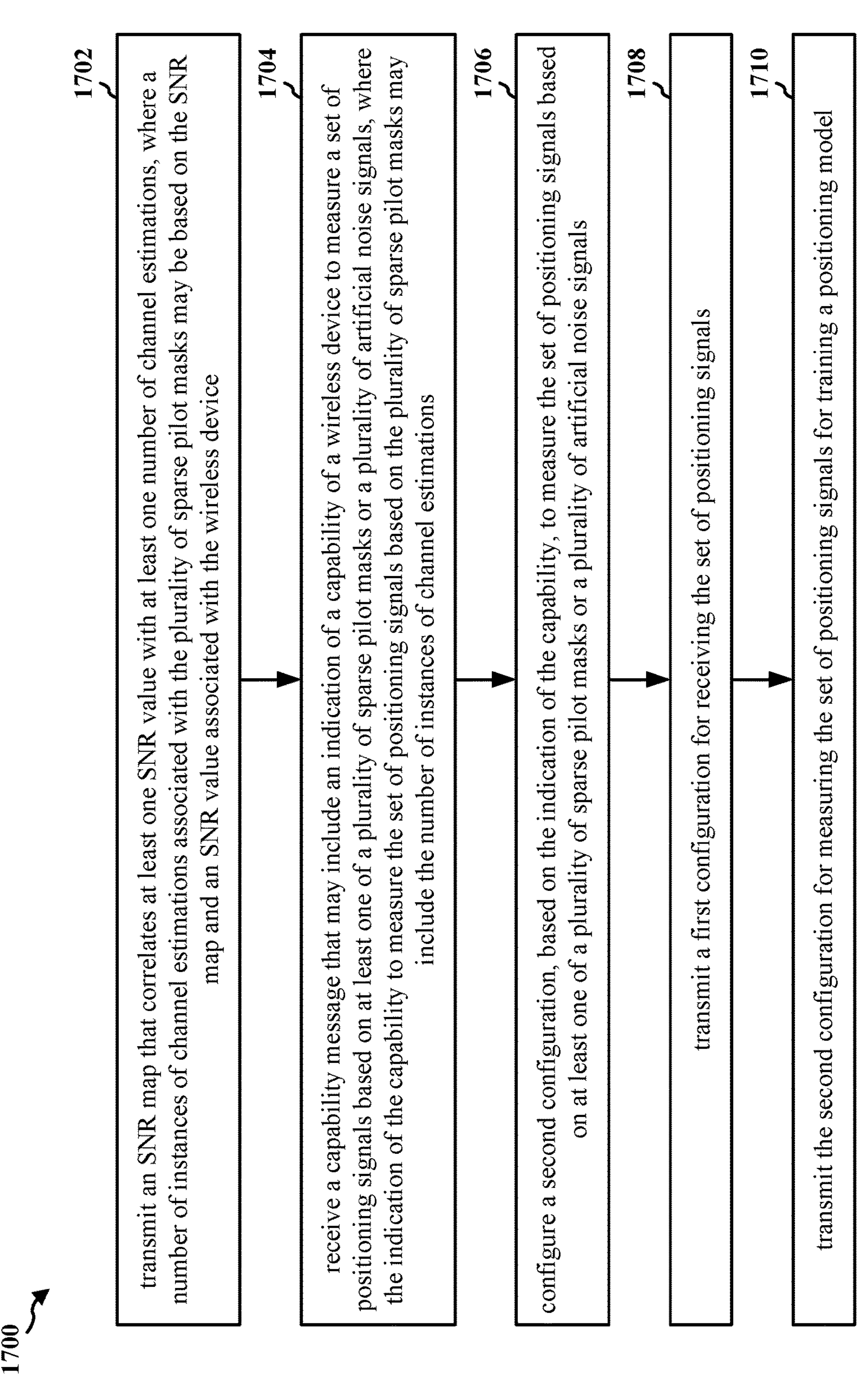
FIG. 17 is a flowchart of a method of wireless communication.

FIG. 17 is a flowchart 1700 of a method of wireless communication. The method may be performed by a network entity (e.g., the base station 102, the base station 310; the wireless device 402, the wireless device 406, the network entity 908; the positioning network entity 1006; the network entity 1802, the network entity 1002, the network entity 1160). At 1702, the network entity may transmit an SNR map that correlates at least one SNR value with at least one number of channel estimations, where a number of instances of channel estimations associated with the plurality of sparse pilot masks may be based on the SNR map and an SNR value associated with the wireless device. For example, 1702 may be performed by the positioning network entity 1006 in FIG. 10, which may transmit an SNR map that correlates at least one SNR value with at least one number of channel estimations, where a number of instances of channel estimations associated with the plurality of sparse pilot masks may be based on the SNR map and an SNR value associated with the wireless device. Moreover, 1702 may be performed by the component 199 in FIG. 19 or 20.

At 1704, the network entity may receive a capability message that may include an indication of a capability of a wireless device to measure a set of positioning signals based on at least one of a plurality of sparse pilot masks or a plurality of artificial noise signals, where the indication of the capability to measure the set of positioning signals based on the plurality of sparse pilot masks may include the number of instances of channel estimations. For example, 1704 may be performed by the positioning network entity 1006 in FIG. 10, which may receive a capability message that may include an indication of a capability of a wireless device to measure a set of positioning signals based on at least one of a plurality of sparse pilot masks or a plurality of artificial noise signals, where the indication of the capability to measure the set of positioning signals based on the plurality of sparse pilot masks may include the number of instances of channel estimations. Moreover, 1704 may be performed by the component 199 in FIG. 19 or 20.

At 1706, the network entity may configure a second configuration, based on the indication of the capability, to measure the set of positioning signals based on at least one of a plurality of sparse pilot masks or a plurality of artificial noise signals. For example, 1706 may be performed by the positioning network entity 1006 in FIG. 10, which may configure a second configuration, based on the indication of the capability, to measure the set of positioning signals based on at least one of a plurality of sparse pilot masks or a plurality of artificial noise signals. Moreover, 1706 may be performed by the component 199 in FIG. 19 or 20.

At 1708, the network entity may transmit a first configuration for receiving a set of positioning signals. For example, 1708 may be performed by the positioning network entity 1006 in FIG. 10, which may transmit a first configuration for receiving the set of positioning signals 1024 as the set of configurations 1014 to the set of positioning neighbor wireless devices 1004 or as the set of configurations 1018 to the positioning target wireless device 1002. Moreover, 1708 may be performed by the component 199 in FIG. 19 or 20.

At 1710, the network entity may transmit the second configuration for measuring the set of positioning signals for training a positioning model. For example, 1710 may be performed by the positioning network entity 1006 in FIG. 10, which may transmit a second configuration for measuring the set of positioning signals 1024 for training a positioning model as the set of configurations 1014 to the set of positioning neighbor wireless devices 1004 or as the set of configurations 1018 to the positioning target wireless device 1002. The second configuration may include a configuration to measure the set of positioning signals 1024 based on at least one of a plurality of sparse pilot masks or a plurality of artificial noise signals. Moreover, 1710 may be performed by the component 199 in FIG. 19 or 20.

Figure 18:
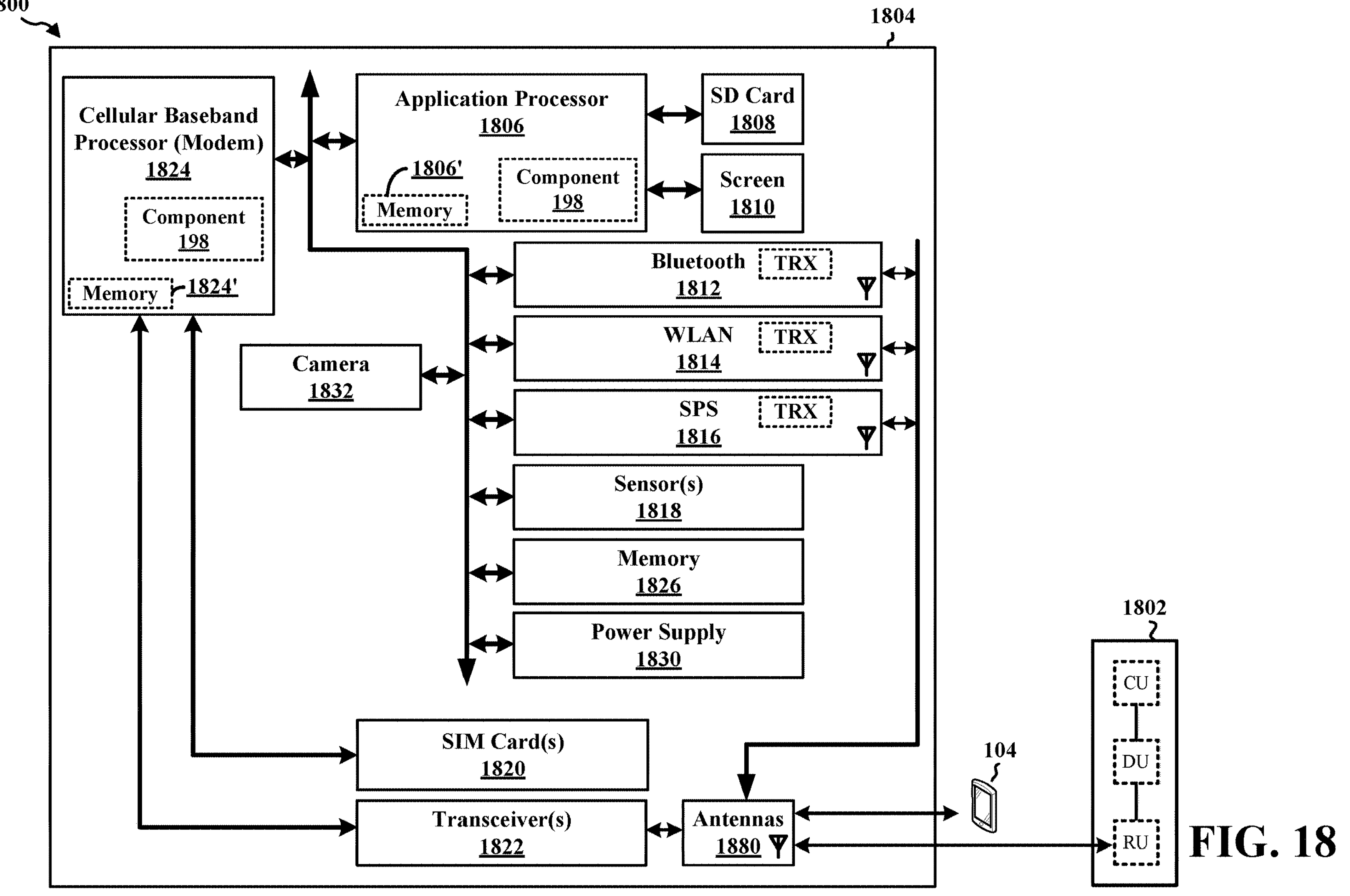
FIG. 18 is a diagram illustrating an example of a hardware implementation for an example apparatus and/or network entity.

FIG. 18 is a diagram 1800 illustrating an example of a hardware implementation for an apparatus 1804. The apparatus 1804 may be a UE, a component of a UE, or may implement UE functionality. In some aspects, the apparatus 1804 may include a cellular baseband processor 1824 (also referred to as a modem) coupled to one or more transceivers 1822 (e.g., cellular RF transceiver). The cellular baseband processor 1824 may include on-chip memory 1824'. In some aspects, the apparatus 1804 may further include one or more subscriber identity modules (SIM) cards 1820 and an application processor 1806 coupled to a secure digital (SD) card 1808 and a screen 1810. The application processor 1806 may include on-chip memory 1806'. In some aspects, the apparatus 1804 may further include a Bluetooth module 1812, a WLAN module 1814, an SPS module 1816 (e.g., GNSS module), one or more sensor modules 1818 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1826, a power supply 1830, and/or a camera 1832. The Bluetooth module 1812, the WLAN module 1814, and the SPS module 1816 may include an on-chip transceiver (TRX) (or in some cases, just a receiver (RX)). The Bluetooth module 1812, the WLAN module 1814, and the SPS module 1816 may include their own dedicated antennas and/or utilize the antennas 1880 for communication. The cellular baseband processor 1824 communicates through the transceiver(s) 1822 via one or more antennas 1880 with the UE 104 and/or with an RU associated with a network entity 1802. The cellular baseband processor 1824 and the application processor 1806 may each include a computer-readable medium/memory 1824', 1806', respectively. The additional memory modules 1826 may also be considered a computer-readable medium/memory. Each computer-readable medium/memory 1824', 1806', 1826 may be non-transitory. The cellular baseband processor 1824 and the application processor 1806 are each responsible for general processing, including the execution of software stored on the computer-readable medium/memory. The software, when executed by the cellular baseband processor 1824/application processor 1806, causes the cellular baseband processor 1824/application processor 1806 to perform the various functions described supra. The computer-readable medium/memory may also be used for storing data that is manipulated by the cellular baseband processor 1824/application processor 1806 when executing software. The cellular baseband processor 1824/application processor 1806 may be a component of the UE 350 and may include the memory 360 and/or at least one of the TX processor 368, the RX processor 356, and the controller/processor 359. In one configuration, the apparatus 1804 may be a processor chip (modem and/or application) and include just the cellular baseband processor 1824 and/or the application processor 1806, and in another configuration, the apparatus 1804 may be the entire UE (e.g., see UE 350 of FIG. 3) and include the additional modules of the apparatus 1804.

As discussed supra, the component 198 may be configured to receive a set of positioning signals. The component 198 may be configured to measure the set of positioning signals based on at least one of a plurality of sparse pilot masks or a plurality of artificial noise signals. The component 198 may be configured to output the measured set of positioning signals for training a positioning model. The component 198 may be within the cellular baseband processor 1824, the application processor 1806, or both the cellular baseband processor 1824 and the application processor 1806. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1804 may include a variety of components configured for various functions. In one configuration, the apparatus 1804, and in particular the cellular baseband processor 1824 and/or the application processor 1806, may include means for receiving a set of positioning signals. The apparatus 1804 may include means for measuring the set of positioning signals based on at least one of a plurality of sparse pilot masks or a plurality of artificial noise signals. The apparatus 1804 may include means for outputting the measured set of positioning signals for training a positioning model. The apparatus 1804 may include means for outputting the measured set of positioning signals by training the positioning model at the wireless device based on the measured set of positioning signals. The apparatus 1804 may include means for outputting the measured set of positioning signals by transmitting, to a training entity, the measured set of positioning signals for training the positioning model. The apparatus 1804 may include means for receiving, from a network entity, a configuration message including a configuration of at least some of the plurality of sparse pilot masks or at least some of the plurality of artificial noise signals. The network entity may include an LMF. The apparatus 1804 may include a UE or a PRU. The configuration message may include an LPP message. The apparatus 1804 may include means for transmitting a capability message including an indication of a capability to measure the set of positioning signals based on at least one of the plurality of sparse pilot masks or the plurality of artificial noise signals. Receiving the configuration may include receiving the configuration based on the indication of the capability to measure the set of positioning signals based on at least one of the plurality of sparse pilot masks or the plurality of artificial noise signals. The indication of the capability to measure the set of positioning signals based on the plurality of sparse pilot masks may include at least one of a number of instances of channel estimations, a set of sparse patterns comprising the plurality of sparse pilot masks, or a set of measurement gap conditions for computing a plurality of channel estimations associated with the plurality of sparse pilot masks. The apparatus 1804 may include means for receiving an SNR map that correlates at least one SNR value with at least one number of channel estimations. The apparatus 1804 may include means for estimating an SNR value associated with the reception of the set of positioning signals. The apparatus 1804 may include means for selecting the number of instances of channel estimations from the SNR map based on the estimated SNR value. The indication of the capability to measure the set of positioning signals based on the plurality of artificial noise signals may include at least one of a number of instances of channel estimations, a noise variance value, a set of noise distribution patterns comprising the plurality of artificial noise signals, or a set of measurement gap conditions for computing a plurality of channel estimations associated with the plurality of artificial noise signals. The apparatus 1804 may include means for estimating an SNR value associated with the reception of the set of positioning signals. The apparatus 1804 may include means for calculating at least one of the number of instances of channel estimations or the noise variance value based on the estimated SNR value. The apparatus 1804 may include a UE or a PRU. The set of positioning signals may include a set of PRSs. The apparatus 1804 may include means for measuring the set of positioning signals based on the plurality of sparse pilot masks by simulating a first set of impaired positioning signals by masking the set of positioning signals based on a first sparse pilot mask of the plurality of sparse pilot masks, simulating a second set of impaired positioning signals by masking the set of positioning signals based on a second sparse pilot mask of the plurality of sparse pilot masks, measuring the first set of impaired positioning signals, and measuring the second set of impaired positioning signals. The apparatus 1804 may include means for measuring the set of positioning signals based on the plurality of artificial noise signals by simulating a first set of impaired positioning signals by combining the set of positioning signals with a first artificial noise signal of the plurality of artificial noise signals, simulating a second set of impaired positioning signals by combining the set of positioning signals with a second artificial noise signal of the plurality of artificial noise signals, measuring the first set of impaired positioning signals, and measuring the second set of impaired positioning signals. The means may be the component 198 of the apparatus 1804 configured to perform the functions recited by the means. As described supra, the apparatus 1804 may include the TX processor 368, the RX processor 356, and the controller/processor 359. As such, in one configuration, the means may be the TX processor 368, the RX processor 356, and/or the controller/processor 359 configured to perform the functions recited by the means.

Figure 19:
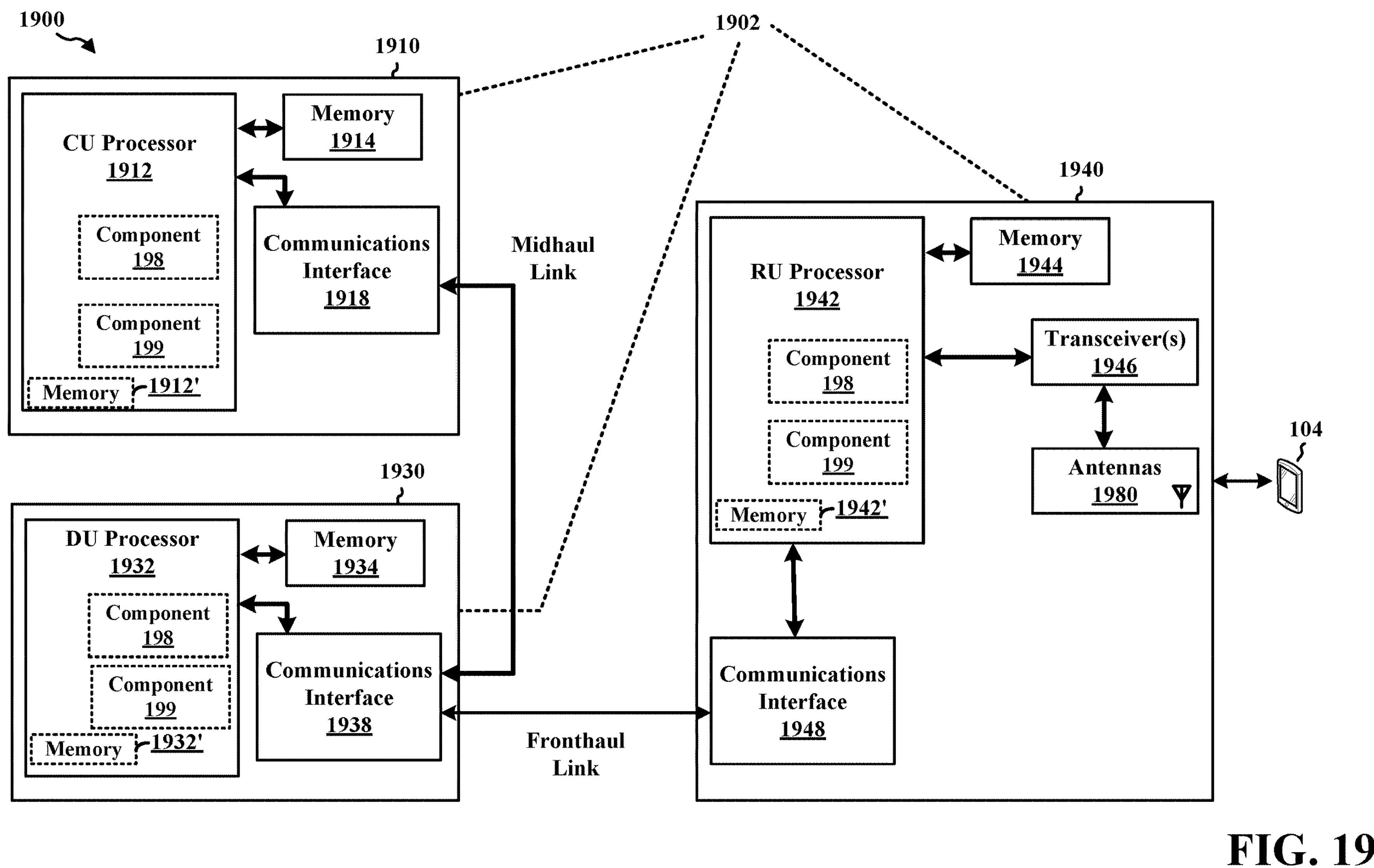
FIG. 19 is a diagram illustrating an example of a hardware implementation for an example network entity.

FIG. 19 is a diagram 1900 illustrating an example of a hardware implementation for a network entity 1902. The network entity 1902 may be a BS, a component of a BS, or may implement BS functionality. The network entity 1902 may include at least one of a CU 1910, a DU 1930, or an RU 1940. For example, depending on the layer functionality handled by the component 199, the network entity 1902 may include the CU 1910; both the CU 1910 and the DU 1930; each of the CU 1910, the DU 1930, and the RU 1940; the DU 1930; both the DU 1930 and the RU 1940; or the RU 1940. The CU 1910 may include a CU processor 1912. The CU processor 1912 may include on-chip memory 1912'. In some aspects, the CU 1910 may further include additional memory modules 1914 and a communications interface 1918. The CU 1910 communicates with the DU 1930 through a midhaul link, such as an F1 interface. The DU 1930 may include a DU processor 1932. The DU processor 1932 may include on-chip memory 1932'. In some aspects, the DU 1930 may further include additional memory modules 1934 and a communications interface 1938. The DU 1930 communicates with the RU 1940 through a fronthaul link. The RU 1940 may include an RU processor 1942. The RU processor 1942 may include on-chip memory 1942'. In some aspects, the RU 1940 may further include additional memory modules 1944, one or more transceivers 1946, antennas 1980, and a communications interface 1948. The RU 1940 communicates with the UE 104. The on-chip memory 1912', 1932', 1942' and the additional memory modules 1914, 1934, 1944 may each be considered a computer-readable medium/memory. Each computer-readable medium/memory may be non-transitory. Each of the processors 1912, 1932, 1942 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 198 may be configured to receive a set of positioning signals. The component 198 may be configured to measure the set of positioning signals based on at least one of a plurality of sparse pilot masks or a plurality of artificial noise signals. The component 198 may be configured to output the measured set of positioning signals for training a positioning model. The component 198 may be within one or more processors of one or more of the CU 1910, DU 1930, and the RU 1940. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1902 may include a variety of components configured for various functions. In one configuration, the network entity 1902 may include means for receiving a set of positioning signals. The network entity 1902 may include means for measuring the set of positioning signals based on at least one of a plurality of sparse pilot masks or a plurality of artificial noise signals. The network entity 1902 may include means for outputting the measured set of positioning signals for training a positioning model. The network entity 1902 may include means for outputting the measured set of positioning signals by training the positioning model at the wireless device based on the measured set of positioning signals. The network entity 1902 may include means for outputting the measured set of positioning signals by transmitting, to a training entity, the measured set of positioning signals for training the positioning model. The network entity 1902 may include means for receiving, from another network entity, a configuration message including a configuration of at least some of the plurality of sparse pilot masks or at least some of the plurality of artificial noise signals. The other network entity may include an LMF. The network entity 1902 may include a network node. The configuration message may include an NRPP message. The network entity 1902 may include means for transmitting a capability message including an indication of a capability to measure the set of positioning signals based on at least one of the plurality of sparse pilot masks or the plurality of artificial noise signals. Receiving the configuration may include receiving the configuration based on the indication of the capability to measure the set of positioning signals based on at least one of the plurality of sparse pilot masks or the plurality of artificial noise signals. The indication of the capability to measure the set of positioning signals based on the plurality of sparse pilot masks may include at least one of a number of instances of channel estimations, a set of sparse patterns comprising the plurality of sparse pilot masks, or a set of measurement gap conditions for computing a plurality of channel estimations associated with the plurality of sparse pilot masks. The network entity 1902 may include means for receiving an SNR map that correlates at least one SNR value with at least one number of channel estimations. The network entity 1902 may include means for estimating an SNR value associated with the reception of the set of positioning signals. The network entity 1902 may include means for selecting the number of instances of channel estimations from the SNR map based on the estimated SNR value. The indication of the capability to measure the set of positioning signals based on the plurality of artificial noise signals may include at least one of a number of instances of channel estimations, a noise variance value, a set of noise distribution patterns comprising the plurality of artificial noise signals, or a set of measurement gap conditions for computing a plurality of channel estimations associated with the plurality of artificial noise signals. The network entity 1902 may include means for estimating an SNR value associated with the reception of the set of positioning signals. The network entity 1902 may include means for calculating at least one of the number of instances of channel estimations or the noise variance value based on the estimated SNR value. The network entity 1902 may include a network node. The set of positioning signals may include a set of SRSs. The network entity 1902 may include means for measuring the set of positioning signals based on the plurality of sparse pilot masks by simulating a first set of impaired positioning signals by masking the set of positioning signals based on a first sparse pilot mask of the plurality of sparse pilot masks, simulating a second set of impaired positioning signals by masking the set of positioning signals based on a second sparse pilot mask of the plurality of sparse pilot masks, measuring the first set of impaired positioning signals, and measuring the second set of impaired positioning signals. The network entity 1902 may include means for measuring the set of positioning signals based on the plurality of artificial noise signals by simulating a first set of impaired positioning signals by combining the set of positioning signals with a first artificial noise signal of the plurality of artificial noise signals, simulating a second set of impaired positioning signals by combining the set of positioning signals with a second artificial noise signal of the plurality of artificial noise signals, measuring the first set of impaired positioning signals, and measuring the second set of impaired positioning signals. The means may be the component 198 of the network entity 1902 configured to perform the functions recited by the means. As described supra, the network entity 1902 may include the TX processor 316, the RX processor 370, and the controller/processor 375. As such, in one configuration, the means may be the TX processor 316, the RX processor 370, and/or the controller/processor 375 configured to perform the functions recited by the means.

As discussed supra, the component 199 may be configured to transmit a first configuration for receiving a set of positioning signals. The measurement error configuration component 199 may be configured to transmit a second configuration for measuring the set of positioning signals for training a positioning model. The second configuration may include a configuration to measure the set of positioning signals based on at least one of a plurality of sparse pilot masks or a plurality of artificial noise signals. The component 199 may be within one or more processors of one or more of the CU 1910, DU 1930, and the RU 1940. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1902 may include a variety of components configured for various functions. In one configuration, the network entity 1902 may include means for transmitting a first configuration for receiving a set of positioning signals. The network entity 1902 may include means for transmitting a second configuration for measuring the set of positioning signals for training a positioning model. The second configuration may include a configuration to measure the set of positioning signals based on at least one of a plurality of sparse pilot masks or a plurality of artificial noise signals. The network entity 1902 may include means for transmitting the first configuration and transmitting the second configuration by transmitting a configuration message including the first configuration and the second configuration. The network entity 1902 may include means for transmitting the first configuration by transmitting a first configuration message including the first configuration. The network entity 1902 may include means for transmitting the second configuration by transmitting a second configuration message including the second configuration. The network entity 1902 may include means for receiving a measured set of positioning signals in response to the transmission of the second configuration. The network entity 1902 may include means for outputting the measured set of positioning signals for training the positioning model. The network entity 1902 may include means for outputting the measured set of positioning signals by training the positioning model at the network entity based on the measured set of positioning signals. The network entity 1902 may include means for outputting the measured set of positioning signals by transmitting, to a training entity, the measured set of positioning signals for training the positioning model. The network entity 1902 may include means for transmitting the second configuration by transmitting the second configuration to a first wireless device and to a second wireless device. The network entity 1902 may include means for receiving a first measured set of positioning signals in response to the transmission of the second configuration to the first wireless device. The network entity 1902 may include means for receiving a second measured set of positioning signals in response to the transmission of the second configuration to the second wireless device. The network entity 1902 may include means for outputting the first measured set of positioning signals and the second measured set of positioning signals for training the positioning model. The first measured set of positioning signals may be associated with a first channel estimation implementation of a plurality of channel estimation implementations. The second measured set of positioning signals may be associated with a second channel estimation implementation of the plurality of channel estimation implementations. The plurality of channel estimation implementations may include at least one of a minimum mean-square error (MMSE) channel estimation implementation, a least-square (LS) channel estimation implementation, or a likelihood based channel estimation implementation. The network entity 1902 may include an LMF. The network entity 1902 may include means for transmitting the second configuration by transmitting, to a wireless device, a configuration message including the second configuration. The wireless device may include a UE or a PRU. The configuration message may include an LPP message. The wireless device may include a network node. The configuration message may include an NRPP message. The network entity 1902 may include means for receiving a capability message comprising an indication of a capability of a wireless device to measure the set of positioning signals based on at least one of the plurality of sparse pilot masks or the plurality of artificial noise signals. The network entity 1902 may include means for configuring the second configuration based on the indication of the capability to measure the set of positioning signals based on at least one of the plurality of sparse pilot masks or the plurality of artificial noise signals. The indication of the capability to measure the set of positioning signals based on the plurality of sparse pilot masks may include at least one of a number of instances of channel estimations, a set of sparse patterns comprising the plurality of sparse pilot masks, or a set of measurement gap conditions for computing a plurality of channel estimations associated with the plurality of sparse pilot masks. The network entity 1902 may include means for transmitting an SNR map that correlates at least one SNR value with at least one number of channel estimations. The number of instances of channel estimations may be based on the SNR map and an SNR value associated with the wireless device. The indication of the capability to measure the set of positioning signals based on the plurality of artificial noise signals may include at least one of a number of instances of channel estimations, a noise variance value, a set of noise distribution patterns including the plurality of artificial noise signals, or a set of measurement gap conditions for computing a plurality of channel estimations associated with the plurality of artificial noise signals. At least one of the number of instances of channel estimations or the noise variance value may be based on an SNR value associated with the wireless device. The wireless device may include a UE, a PRU, or a network node. The set of positioning signals may include a set of SRSs or a set of PRSs. The means may be the component 199 of the network entity 1902 configured to perform the functions recited by the means. As described supra, the network entity 1902 may include the TX processor 316, the RX processor 370, and the controller/processor 375. As such, in one configuration, the means may be the TX processor 316, the RX processor 370, and/or the controller/processor 375 configured to perform the functions recited by the means.

Figure 20:
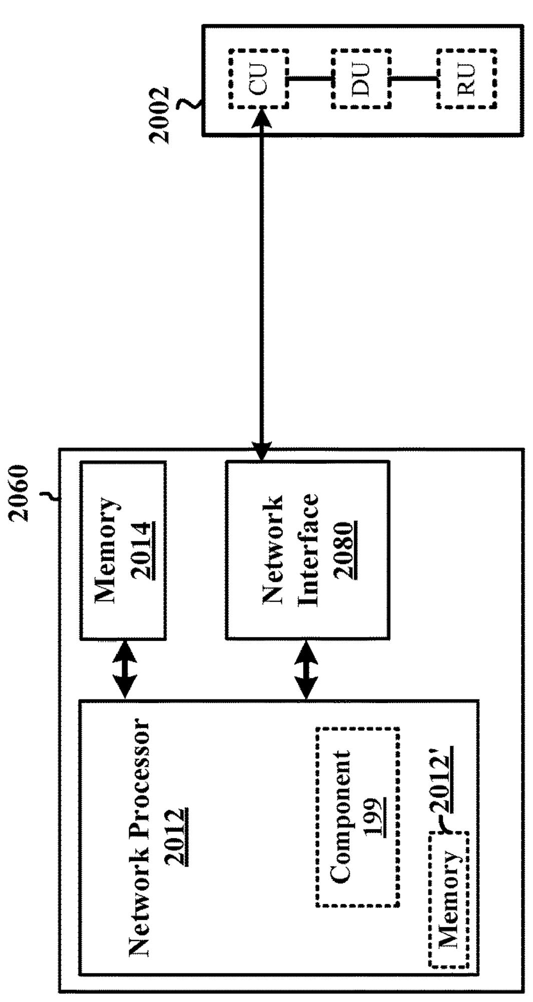
FIG. 20 is a diagram illustrating an example of a hardware implementation for an example network entity.

FIG. 20 is a diagram 2000 illustrating an example of a hardware implementation for a network entity 2060. In one example, the network entity 2060 may be within the core network 120. The network entity 2060 may include a network processor 2012. The network processor 2012 may include on-chip memory 2012'. In some aspects, the network entity 2060 may further include additional memory modules 2014. The network entity 2060 communicates via the network interface 2080 directly (e.g., backhaul link) or indirectly (e.g., through a RIC) with the CU 2002. The on-chip memory 2012' and the additional memory modules 2014 may each be considered a computer-readable medium/memory. Each computer-readable medium/memory may be non-transitory. The processor 2012 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 may be configured to transmit a first configuration for receiving a set of positioning signals. The component 199 may be configured to transmit a second configuration for measuring the set of positioning signals for training a positioning model. The second configuration may include a configuration to measure the set of positioning signals based on at least one of a plurality of sparse pilot masks or a plurality of artificial noise signals. The component 199 may be within the processor 2012. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 2060 may include a variety of components configured for various functions. In one configuration, the network entity 2060 may include means for transmitting a first configuration for receiving a set of positioning signals. The network entity 2060 may include means for transmitting a second configuration for measuring the set of positioning signals for training a positioning model. The second configuration may include a configuration to measure the set of positioning signals based on at least one of a plurality of sparse pilot masks or a plurality of artificial noise signals. The network entity 2060 may include means for transmitting the first configuration and transmitting the second configuration by transmitting a configuration message including the first configuration and the second configuration. The network entity 2060 may include means for transmitting the first configuration by transmitting a first configuration message including the first configuration. The network entity 2060 may include means for transmitting the second configuration by transmitting a second configuration message including the second configuration. The network entity 2060 may include means for receiving a measured set of positioning signals in response to the transmission of the second configuration. The network entity 2060 may include means for outputting the measured set of positioning signals for training the positioning model. The network entity 2060 may include means for outputting the measured set of positioning signals by training the positioning model at the network entity based on the measured set of positioning signals. The network entity 2060 may include means for outputting the measured set of positioning signals by transmitting, to a training entity, the measured set of positioning signals for training the positioning model. The network entity 2060 may include means for transmitting the second configuration by transmitting the second configuration to a first wireless device and to a second wireless device. The network entity 2060 may include means for receiving a first measured set of positioning signals in response to the transmission of the second configuration to the first wireless device. The network entity 2060 may include means for receiving a second measured set of positioning signals in response to the transmission of the second configuration to the second wireless device. The network entity 2060 may include means for outputting the first measured set of positioning signals and the second measured set of positioning signals for training the positioning model. The first measured set of positioning signals may be associated with a first channel estimation implementation of a plurality of channel estimation implementations. The second measured set of positioning signals may be associated with a second channel estimation implementation of the plurality of channel estimation implementations. The plurality of channel estimation implementations may include at least one of an MMSE channel estimation implementation, an LS channel estimation implementation, or a likelihood based channel estimation implementation. The network entity 2060 may include an LMF. The network entity 2060 may include means for transmitting the second configuration by transmitting, to a wireless device, a configuration message including the second configuration. The wireless device may include a UE or a PRU. The configuration message may include an LPP message. The wireless device may include a network node. The configuration message may include an NRPP message. The network entity 2060 may include means for receiving a capability message comprising an indication of a capability of a wireless device to measure the set of positioning signals based on at least one of the plurality of sparse pilot masks or the plurality of artificial noise signals. The network entity 2060 may include means for configuring the second configuration based on the indication of the capability to measure the set of positioning signals based on at least one of the plurality of sparse pilot masks or the plurality of artificial noise signals. The indication of the capability to measure the set of positioning signals based on the plurality of sparse pilot masks may include at least one of a number of instances of channel estimations, a set of sparse patterns comprising the plurality of sparse pilot masks, or a set of measurement gap conditions for computing a plurality of channel estimations associated with the plurality of sparse pilot masks. The network entity 2060 may include means for transmitting an SNR map that correlates at least one SNR value with at least one number of channel estimations. The number of instances of channel estimations may be based on the SNR map and an SNR value associated with the wireless device. The indication of the capability to measure the set of positioning signals based on the plurality of artificial noise signals may include at least one of a number of instances of channel estimations, a noise variance value, a set of noise distribution patterns including the plurality of artificial noise signals, or a set of measurement gap conditions for computing a plurality of channel estimations associated with the plurality of artificial noise signals. At least one of the number of instances of channel estimations or the noise variance value may be based on an SNR value associated with the wireless device. The wireless device may include a UE, a PRU, or a network node. The set of positioning signals may include a set of SRSs or a set of PRSs. The means may be the component 199 of the network entity 2060 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean “one and only one” unless specifically so stated, but rather “one or more.” Terms such as “if,” “when,” and “while” do not imply an immediate temporal relationship or reaction. That is, these phrases, e.g., “when,” do not imply an immediate action in response to or during the occurrence of an action, but simply imply that if a condition is met then an action will occur, but without requiring a specific or immediate time constraint for the action to occur. The word “exemplary” is used herein to mean “serving as an example, instance, or illustration.” Any aspect described herein as “exemplary” is not necessarily to be construed as preferred or advantageous over other aspects. Unless specifically stated otherwise, the term “some” refers to one or more. Combinations such as “at least one of A, B, or C,” “one or more of A, B, or C,” “at least one of A, B, and C,” “one or more of A, B, and C,” and “A, B, C, or any combination thereof” include any combination of A, B, and/or C, and may include multiples of A, multiples of B, or multiples of C. Specifically, combinations such as “at least one of A, B, or C,” “one or more of A, B, or C,” “at least one of A, B, and C,” “one or more of A, B, and C,” and “A, B, C, or any combination thereof” may be A only, B only, C only, A and B, A and C, B and C, or A and B and C, where any such combinations may contain one or more member or members of A, B, or C. Sets should be interpreted as a set of elements where the elements number one or more. Accordingly, for a set of X. X would include one or more elements. If a first apparatus receives data from or transmits data to a second apparatus, the data may be received/transmitted directly between the first and second apparatuses, or indirectly between the first and second apparatuses through a set of apparatuses. A device configured to “output” data, such as a transmission, signal, or message, may transmit the data, for example with a transceiver, may send the data to a device that transmits the data, or may output the data to a component of the device. A device configured to “obtain” data, such as a transmission, signal, or message, may receive the data, for example with a transceiver, may obtain the data from a device that receives the data, or may obtain the data from a component of the device. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words “module,” “mechanism,” “element,” “device,” and the like may not be a substitute for the word “means.” As such, no claim element is to be construed as a means plus function unless the element is expressly recited using the phrase “means for.”

As used herein, the phrase “based on” shall not be construed as a reference to a closed set of information, one or more conditions, one or more factors, or the like. In other words, the phrase “based on A” (where “A” may be information, a condition, a factor, or the like) shall be construed as “based at least on A” unless specifically recited differently.

The following aspects are illustrative only and may be combined with other aspects or teachings described herein, without limitation.

Aspect 1 is a method of wireless communication at a wireless device, wherein the method comprises receiving a set of positioning signals. The method further comprises measuring the set of positioning signals based on at least one of a plurality of sparse pilot masks or a plurality of artificial noise signals. The method further comprises outputting the measured set of positioning signals for training a positioning model.

Aspect 2 is the method of aspect 1, wherein outputting the measured set of positioning signals comprises training the positioning model at the wireless device based on the measured set of positioning signals.

Aspect 3 is the method of aspect 1, wherein outputting the measured set of positioning signals comprises transmitting, to a training entity, the measured set of positioning signals for training the positioning model.

Aspect 4 is the method of any of aspects 1 to 3, wherein the method further comprises receiving, from a network entity, a configuration message comprising a configuration of at least some of the plurality of sparse pilot masks or at least some of the plurality of artificial noise signals.

Aspect 5 is the method of aspect 4, wherein the network entity comprises a location management function (LMF).

Aspect 6 is the method of either of aspects 4 or 5, wherein the wireless device comprises a user equipment (UE) or a positioning reference unit (PRU), wherein the configuration message comprises a long term evolution (LTE) positioning protocol (LPP) message.

Aspect 7 is the method of either of aspects 4 or 5, wherein the wireless device comprises a network node, wherein the configuration message comprises a new radio (NR) positioning protocol (NRPP) message.

Aspect 8 is the method of any of aspects 4 to 7, wherein the method further comprises transmitting a capability message comprising an indication of a capability to measure the set of positioning signals based on at least one of the plurality of sparse pilot masks or the plurality of artificial noise signals, wherein receiving the configuration comprises receiving the configuration based on the indication of the capability to measure the set of positioning signals based on at least one of the plurality of sparse pilot masks or the plurality of artificial noise signals.

Aspect 9 is the method of aspect 8, wherein the indication of the capability to measure the set of positioning signals based on the plurality of sparse pilot masks comprises at least one of a number of instances of channel estimations, a set of sparse patterns comprising the plurality of sparse pilot masks, or a set of measurement gap conditions for computing a plurality of channel estimations associated with the plurality of sparse pilot masks.

Aspect 10 is the method of aspect 9, wherein the method further comprises receiving a signal-to-noise ratio (SNR) map that correlates at least one SNR value with at least one number of channel estimations. The method further comprises estimating an SNR value associated with the reception of the set of positioning signals. The method further comprises selecting the number of instances of channel estimations from the SNR map based on the estimated SNR value.

Aspect 11 is the method of aspect 8, wherein the indication of the capability to measure the set of positioning signals based on the plurality of artificial noise signals comprises at least one of a number of instances of channel estimations, a noise variance value, a set of noise distribution patterns comprising the plurality of artificial noise signals, or a set of measurement gap conditions for computing a plurality of channel estimations associated with the plurality of artificial noise signals.

Aspect 12 is the method of aspect 11, wherein the method further comprises estimating a signal-to-noise ratio (SNR) value associated with the reception of the set of positioning signals. The method further comprises calculating at least one of the number of instances of channel estimations or the noise variance value based on the estimated SNR value.

Aspect 13 is the method of any of aspects 1 to 12, wherein the wireless device comprises a user equipment (UE), a positioning reference unit (PRU), or a network node.

Aspect 14 is the method of any of aspects 1 to 13, wherein the set of positioning signals comprises a set of sounding reference signals (SRSs) or a set of positioning reference signals (PRSs).

Aspect 15 is the method of any of aspects 1 to 14, wherein measuring the set of positioning signals based on the plurality of sparse pilot masks comprises simulating a first set of impaired positioning signals by masking the set of positioning signals based on a first sparse pilot mask of the plurality of sparse pilot masks, simulating a second set of impaired positioning signals by masking the set of positioning signals based on a second sparse pilot mask of the plurality of sparse pilot masks, measuring the first set of impaired positioning signals, and measuring the second set of impaired positioning signals.

Aspect 16 is the method of any of aspects 1 to 15, measuring the set of positioning signals based on the plurality of artificial noise signals comprises simulating a first set of impaired positioning signals by combining the set of positioning signals with a first artificial noise signal of the plurality of artificial noise signals, simulating a second set of impaired positioning signals by combining the set of positioning signals with a second artificial noise signal of the plurality of artificial noise signals, measuring the first set of impaired positioning signals, and measuring the second set of impaired positioning signals.

Aspect 17 is a method of wireless communication at a network entity, wherein the method comprises transmitting a first configuration for receiving a set of positioning signals. The method further comprises transmitting a second configuration for measuring the set of positioning signals for training a positioning model, wherein the second configuration comprises a configuration to measure the set of positioning signals based on at least one of a plurality of sparse pilot masks or a plurality of artificial noise signals.

Aspect 18 is the method of aspect 17, wherein transmitting the first configuration and transmitting the second configuration comprises transmitting a configuration message comprising the first configuration and the second configuration.

Aspect 19 is the method of either of aspects 17 or 18, wherein transmitting the first configuration comprises transmitting a first configuration message comprising the first configuration, and wherein transmitting the second configuration comprises transmitting a second configuration message comprising the second configuration.

Aspect 20 is the method of any of aspects 17 to 19, wherein the method further comprises receiving a measured set of positioning signals in response to the transmission of the second configuration. The method further comprises outputting the measured set of positioning signals for training the positioning model.

Aspect 21 is a method of aspect 20, wherein outputting the measured set of positioning signals comprises training the positioning model at the network entity based on the measured set of positioning signals.

Aspect 22 is the method of aspect 20, wherein outputting the measured set of positioning signals comprises transmitting, to a training entity, the measured set of positioning signals for training the positioning model.

Aspect 23 is the method of any of aspects 17 to 22, wherein transmitting the second configuration comprises transmitting the second configuration to a first wireless device and to a second wireless device. The method further comprises receiving a first measured set of positioning signals in response to the transmission of the second configuration to the first wireless device. The method further comprises receiving a second measured set of positioning signals in response to the transmission of the second configuration to the second wireless device. The method further comprises outputting the first measured set of positioning signals and the second measured set of positioning signals for training the positioning model.

Aspect 24 is the method of aspect 23, wherein the first measured set of positioning signals is associated with a first channel estimation implementation of a plurality of channel estimation implementations, wherein the second measured set of positioning signals is associated with a second channel estimation implementation of the plurality of channel estimation implementations.

Aspect 25 is the method of aspect 24, wherein the plurality of channel estimation implementations comprises at least one of a minimum mean-square error (MMSE) channel estimation implementation, a least-square (LS) channel estimation implementation, or a likelihood based channel estimation implementation.

Aspect 26 is the method of any of aspects 17 to 25, wherein the network entity comprises a location management function (LMF).

Aspect 27 is the method of any of aspects 17 to 26, wherein transmitting the second configuration comprises transmitting, to a wireless device, a configuration message comprising the second configuration, wherein the wireless device comprises a user equipment (UE) or a positioning reference unit (PRU), wherein the configuration message comprises a long term evolution (LTE) positioning protocol (LPP) message.

Aspect 28 is the method of any of aspects 17 to 27, wherein transmitting the second configuration comprises transmitting, to a wireless device, a configuration message comprising the second configuration, wherein the wireless device comprises a network node, wherein the configuration message comprises a new radio (NR) positioning protocol (NRPP) message.

Aspect 29 is the method of any of aspects 17 to 28, wherein the method further comprises receiving a capability message comprising an indication of a capability of a wireless device to measure the set of positioning signals based on at least one of the plurality of sparse pilot masks or the plurality of artificial noise signals. The method further comprises configuring the second configuration, based on the indication of the capability, to measure the set of positioning signals based on at least one of the plurality of sparse pilot masks or the plurality of artificial noise signals.

Aspect 30 is the method of claim 29, wherein the indication of the capability to measure the set of positioning signals based on the plurality of sparse pilot masks comprises at least one of a number of instances of channel estimations, a set of sparse patterns comprising the plurality of sparse pilot masks, or a set of measurement gap conditions for computing a plurality of channel estimations associated with the plurality of sparse pilot masks.

Aspect 31 is the method of aspect 30, wherein the method further comprises transmitting a signal-to-noise ratio (SNR) map that correlates at least one SNR value with at least one number of channel estimations, wherein the number of instances of channel estimations is based on the SNR map and an SNR value associated with the wireless device.

Aspect 32 is the method of aspect 29, wherein the indication of the capability to measure the set of positioning signals based on the plurality of artificial noise signals comprises at least one of a number of instances of channel estimations, a noise variance value, a set of noise distribution patterns comprising the plurality of artificial noise signals, or a set of measurement gap conditions for computing a plurality of channel estimations associated with the plurality of artificial noise signals.

Aspect 33 is the method of aspect 32, wherein at least one of the number of instances of channel estimations or the noise variance value is based on a signal-to-noise ratio (SNR) value associated with the wireless device.

Aspect 34 is the method of any of aspects 29 to 33, wherein the wireless device comprises a user equipment (UE), a positioning reference unit (PRU), or a network node.

Aspect 35 is the method of any of aspects 17 to 34, wherein the set of positioning signals comprises a set of sounding reference signals (SRSs) or a set of positioning reference signals (PRSs).

Aspect 36 is an apparatus for wireless communication, including: at least one memory; and at least one processor coupled to the at least one memory and, based at least in part on information stored in the at least one memory, the at least one processor, individually or in any combination, is configured to implement any of aspects 1 to 35.

Aspect 37 is the apparatus of aspect 36, further including at least one of an antenna or a transceiver coupled to the at least one processor.

Aspect 38 is an apparatus for wireless communication including means for implementing any of aspects 1 to 35.

Aspect 39 is a computer-readable medium (e.g., a non-transitory computer-readable medium) storing computer executable code, where the code when executed by a processor causes the processor to implement any of aspects 1 to 35.

What is claimed is:

1. An apparatus for wireless communication at a wireless device, comprising:
- at least one memory; and
- at least one processor coupled to the at least one memory and, based at least in part on information stored in the at least one memory, the at least one processor is configured to:
  - receive a set of positioning signals;
  - measure the set of positioning signals based on a plurality of sparse pilot masks, wherein each sparse pilot mask of the plurality of sparse pilot masks is configured to mask at least some of a positioning signal of the received set of positioning signals; and
  - output the measured set of positioning signals for training a positioning model.

2. The apparatus of claim 1, wherein, to output the measured set of positioning signals, the at least one processor is configured to:
- output at least one of:
  - a reference signal received power (RSRP);
  - a channel impulse response (CIR);
  - a time of arrival (ToA);
  - a reference signal time difference (RSTD); or
  - an angle of departure (AoD).

3. The apparatus of claim 1 further comprising a transceiver coupled to the at least one processor, wherein, to output the measured set of positioning signals, the at least one processor is configured to:
- transmit, to a training entity via the transceiver, the measured set of positioning signals for training the positioning model; or
- train the positioning model at the wireless device based on the measured set of positioning signals.

4. The apparatus of claim 1, wherein the at least one processor is further configured to:
- receive, from a network entity, a configuration message comprising a configuration of the plurality of sparse pilot masks.

5. The apparatus of claim 4, wherein the network entity comprises a location management function (LMF).

6. The apparatus of claim 4, wherein the wireless device comprises a user equipment (UE) or a positioning reference unit (PRU), wherein the configuration message comprises a long term evolution (LTE) positioning protocol (LPP) message.

7. The apparatus of claim 4, wherein the wireless device comprises a network node, wherein the configuration message comprises a new radio (NR) positioning protocol (NRPP) message.

8. The apparatus of claim 4, wherein the at least one processor is further configured to:
- transmit a capability message comprising an indication of a capability to measure the set of positioning signals based on the plurality of sparse pilot masks, wherein, to receive the configuration message, the at least one processor is configured to;
  - receive the configuration message based on the transmitted capability message.

9. The apparatus of claim 8, wherein the indication of the capability to measure the set of positioning signals based on the plurality of sparse pilot masks comprises at least one of:
- a number of instances of channel estimations;
- a set of sparse patterns comprising the plurality of sparse pilot masks; or
- a set of measurement gap conditions for computing a plurality of channel estimations associated with the plurality of sparse pilot masks.

10. The apparatus of claim 9, wherein, to receive the configuration message comprising the configuration of the plurality of sparse pilot masks, the at least one processor is configured to:
- receive a signal-to-noise ratio (SNR) map that correlates at least one SNR value with at least one number of channel estimations, wherein the at least one processor is further configured to:
  - estimate an SNR value associated with a reception of the set of positioning signals; and
  - select the number of instances of channel estimations from the SNR map based on the estimated SNR value.

11. The apparatus of claim 1, wherein the set of positioning signals comprises a set of sounding reference signals (SRSs) or a set of positioning reference signals (PRSs).

12. The apparatus of claim 1, wherein, to measure the set of positioning signals based on the plurality of sparse pilot masks, the at least one processor is configured to:

simulate a first set of impaired positioning signals by masking the set of positioning signals based on a first sparse pilot mask of the plurality of sparse pilot masks;

simulate a second set of impaired positioning signals by masking the set of positioning signals based on a second sparse pilot mask of the plurality of sparse pilot masks;

measure the first set of impaired positioning signals; and measure the second set of impaired positioning signals, wherein the measured set of positioning signals comprise the measured first set of impaired positioning signals and the measured second set of impaired positioning signals.

13. The apparatus of claim 1, wherein the at least one processor is further configured to:

measure the set of positioning signals based on addition of the set of positioning signals to each artificial noise signal of a plurality of artificial noise signals.

14. The apparatus of claim 13, wherein the at least one processor is further configured to:

transmit, to a network entity, a capability message comprising an indication of a capability to measure the set of positioning signals based on the plurality of artificial noise signals; and receive, from the network entity, a configuration message comprising a configuration of the plurality of artificial noise signals based on the transmitted capability message.

15. The apparatus of claim 14, wherein the indication of the capability to measure the set of positioning signals based on the plurality of artificial noise signals comprises at least one of:

a number of instances of channel estimations;

a noise variance value;

a set of noise distribution patterns comprising the plurality of artificial noise signals; or a set of measurement gap conditions for computing a plurality of channel estimations associated with the plurality of artificial noise signals.

16. The apparatus of claim 13, wherein the at least one processor is further configured to:

simulate a first set of impaired positioning signals by combining the set of positioning signals with a first artificial noise signal of the plurality of artificial noise signals;

simulate a second set of impaired positioning signals by combining the set of positioning signals with a second artificial noise signal of the plurality of artificial noise signals;

measure the first set of impaired positioning signals; and measure the second set of impaired positioning signals, wherein the measured set of positioning signals comprise the measured first set of impaired positioning signals and the measured second set of impaired positioning signals.

17. An apparatus for wireless communication at a network entity, comprising:

at least one memory; and at least one processor coupled to the at least one memory and, based at least in part on information stored in the at least one memory, the at least one processor is configured to:

transmit a first configuration for receiving a set of positioning signals; and transmit a second configuration for measuring the set of positioning signals for training a positioning model, wherein the second configuration comprises a configuration to measure the set of positioning signals based on a plurality of sparse pilot masks wherein each sparse pilot mask of the plurality of sparse pilot masks is configured to mask at least some of a positioning signal of the set of positioning signals.

18. The apparatus of claim 17, further comprising a transceiver coupled to the at least one processor, wherein, to transmit the first configuration and transmit the second configuration, the at least one processor is configured to:

transmit, via the transceiver, a configuration message comprising the first configuration and the second configuration.

19. The apparatus of claim 17, wherein, to transmit the first configuration, the at least one processor is configured to:

transmit a first configuration message comprising the first configuration, and wherein, to transmit the second configuration, the at least one processor is configured to:

transmit a second configuration message comprising the second configuration.

20. The apparatus of claim 17, wherein the at least one processor is further configured to:

receive a measured set of positioning signals in response to a transmission of the second configuration; and output the measured set of positioning signals for training the positioning model.

21. The apparatus of claim 20, wherein, to output the measured set of positioning signals, the at least one processor is configured to:

train the positioning model at the network entity based on the measured set of positioning signals; or transmit, to a training entity, the measured set of positioning signals for training the positioning model.

22. The apparatus of claim 17, wherein, to transmit the second configuration, the at least one processor is configured to;

transmit the second configuration to a first wireless device and to a second wireless device, wherein the at least one processor is further configured to:

receive a first measured set of positioning signals in response to a transmission of the second configuration to the first wireless device;

receive a second measured set of positioning signals in response to the transmission of the second configuration to the second wireless device; and output the first measured set of positioning signals and the second measured set of positioning signals for training the positioning model.

23. The apparatus of claim 22, wherein the first measured set of positioning signals is associated with a first channel estimation implementation of a plurality of channel estimation implementations, wherein the second measured set of positioning signals is associated with a second channel estimation implementation of the plurality of channel estimation implementations.

24. The apparatus of claim 23, wherein the plurality of channel estimation implementations comprises at least one of a minimum mean-square error (MMSE) channel estimation implementation, a least-square (LS) channel estimation implementation, or a likelihood based channel estimation implementation.

25. The apparatus of claim 17, wherein the network entity comprises a location management function (LMF).

26. The apparatus of claim 17, wherein, to transmit the second configuration, the at least one processor is configured to;

transmit, to a wireless device, a configuration message comprising the second configuration, wherein the wireless device comprises a user equipment (UE) or a positioning reference unit (PRU), wherein the configuration message comprises a long term evolution (LTE) positioning protocol (LPP) message.

27. The apparatus of claim 17, wherein, to transmit the second configuration, the at least one processor is configured to:

transmit, to a wireless device, a configuration message comprising the second configuration, wherein the wireless device comprises a network node, wherein the configuration message comprises a new radio (NR) positioning protocol (NRPP) message.

28. The apparatus of claim 17, wherein the second configuration further comprises a second configuration to measure the set of positioning signals based on addition of the set of positioning signals to each artificial noise signal of a plurality of artificial noise signals.

29. A method of wireless communication at a wireless device, comprising:

receiving a set of positioning signals;

measuring the set of positioning signals based on a plurality of sparse pilot masks, wherein each sparse pilot mask of the plurality of sparse pilot masks is configured to mask at least some of a positioning signal of the received set of positioning signals; and outputting the measured set of positioning signals for training a positioning model.

30. A method of wireless communication at a network entity, comprising:

transmitting a first configuration for receiving a set of positioning signals; and transmitting a second configuration for measuring the set of positioning signals for training a positioning model, wherein the second configuration comprises a configuration to measure the set of positioning signals based on a plurality of sparse pilot masks wherein each sparse pilot mask of the plurality of sparse pilot masks is configured to mask at least some of a positioning signal of the set of positioning signals.

* * * * *